(12) United States Patent
Shawgo et al.

(10) Patent No.: US 11,327,013 B2
(45) Date of Patent: May 10, 2022

(54) SPECULAR VARIABLE ANGLE ABSOLUTE REFLECTANCE METHOD AND REFLECTOMETER

(71) Applicant: THE BOEING COMPANY, Chicago, IL (US)

(72) Inventors: Loyal Bruce Shawgo, O'Fallon, MO (US); Jeffery Thomas Murphy, Troy, MO (US)

(73) Assignee: THE BOEING COMPANY, Chicago, IL (US)

( * ) Notice: Subject to any disclaimer, the term of this patent is extended or adjusted under 35 U.S.C. 154(b) by 64 days.

(21) Appl. No.: 16/874,924

(22) Filed: May 15, 2020

(65) Prior Publication Data

US 2021/0356395 A1 Nov. 18, 2021

(51) Int. Cl.
*G01N 21/55* (2014.01)
*G01N 21/64* (2006.01)

(52) U.S. Cl.
CPC ....... *G01N 21/55* (2013.01); *G01N 2021/557* (2013.01); *G01N 2021/6469* (2013.01)

(58) Field of Classification Search
CPC ............. G01N 21/211; G01N 21/9501; G01N 21/956; G01N 21/47; G01N 21/55;
(Continued)

(56) References Cited

U.S. PATENT DOCUMENTS

| 3,402,631 A | 9/1968 | Potter |
| 4,505,586 A | 3/1985 | Tochigi et al. |

(Continued)

FOREIGN PATENT DOCUMENTS

| DE | 3152972 C2 * | 12/1989 | ........... G01N 21/031 |
| EP | 3537134 A1 * | 9/2019 | ............. G01N 21/63 |

(Continued)

OTHER PUBLICATIONS

Extended European Search Report and Written Opinion for corresponding EP Application No. 19161557.4-1020 dated Apr. 26, 2019.
(Continued)

*Primary Examiner* — Michael P Stafira
(74) *Attorney, Agent, or Firm* — The Small Patent Law Group LLC; Jay J. Hoette

(57) ABSTRACT

A specular variable angle absolute reflectometer includes a light source and a mirror system in a light path of the light source. The mirror system is configured to reflect a light beam from the light source towards a sample that is optically reflective. The device also includes an elliptical roof mirror disposed in the light path after the sample having an ellipsoidal reflector surface configured to reflect the light beam back towards the sample. The device also includes a mechanism connected to the elliptical roof mirror. The mechanism is configured to rotate the elliptical roof mirror about an axis of the sample. The device also includes a detector in the light path after the elliptical roof mirror such that the detector receives light that has been reflected from the elliptical roof mirror, thence back to the sample, thence back to the mirror system, and thence to the detector.

23 Claims, 15 Drawing Sheets

(58) Field of Classification Search
CPC ........... G01N 2021/213; G01N 21/636; G01N 2021/646; G01N 2021/8825; G01N 21/64; G01N 21/9503; G01N 21/94; G01N 21/8806; G01N 21/21; G01N 23/201; G01N 21/474; G01N 2021/335; G01N 23/207; G01N 21/3563; G01N 21/33; G01N 2021/556; G01N 21/27; G01N 21/4788; G01N 21/9506; G01N 2021/3568; G01N 2201/065; G01N 2021/8427; G01N 2021/1725; G01N 2021/8841; G01N 2021/95676; G01N 21/1717; G01N 21/25; G01N 21/958; G01N 2201/103; G01N 2201/104; G01N 2201/1045; G01N 2201/12; G01N 2223/308; G01N 2021/3137; G01N 2021/4711; G01N 21/4795; G01N 2223/054; G01N 2021/4792; G01N 21/359; G01N 2201/0612; G01N 21/4785; G01N 21/65; G01N 2201/0637; G01N 23/20; G01N 2201/08; G01N 23/20083; G01N 23/2076; G01N 2021/4757; G01N 2021/8848; G01N 21/031; G01N 21/274; G01N 21/3581; G01N 21/8422; G01N 21/8851; G01N 21/954; G01N 21/95607; G01N 2201/0806; G01N 2223/303; G01N 2223/309; G01N 2223/316; G01N 2223/6116; G01N 23/083; G01N 15/0806; G01N 2021/4704; G01N 21/4133; G01N 21/4738; G01N 21/93; G01N 23/20008; G01N 23/20075; G01N 23/2055; G01N 2021/212; G01N 2021/215; G01N 2021/3595; G01N 2021/4752; G01N 2021/557; G01N 2021/6469; G01N 2021/8845; G01N 21/3586; G01N 21/39; G01N 21/85; G01N 21/9505; G01N 21/952; G01N 2201/061; G01N 2201/0636; G01N 2201/064; G01N 2201/068; G01N 2203/0641; G01N 2223/03; G01N 2223/645; G01N 2223/6462; G01N 23/02; G01N 23/04; G01N 23/205; G01N 23/2204; G01N 23/223; G02B 26/105; G02B 19/0085; G02B 17/0615; G02B 17/0657; G02B 19/0028; G02B 17/008; G02B 19/0023; G02B 19/0047; G02B 19/009; G02B 21/0024; G02B 21/0028; G02B 21/0032; G02B 21/06; G02B 27/0043; G02B 27/0068; G02B 27/283; G02B 5/08; G02B 7/023; G02B 13/143; G02B 17/00; G02B 17/023; G02B 17/0663; G02B 17/0673; G02B 17/08; G02B 17/0816; G02B 17/084; G02B 19/0076; G02B 23/00; G02B 27/0927; G02B 27/0994; G02B 27/64; G02B 5/0252; G02B 5/10; G02B 5/20; G02B 6/0001; G02B 6/0008; G02B 6/4214; G02B 6/4296; G02B 7/182; G02B 7/198

See application file for complete search history.

(56) References Cited

U.S. PATENT DOCUMENTS

| | | |
|---|---|---|
| 4,844,617 A | 7/1989 | Kelderman et al. |
| 4,872,755 A | 10/1989 | Kuchel |
| 4,896,952 A | 1/1990 | Rosenbluth |
| 5,471,981 A | 12/1995 | Wiggins et al. |
| 6,094,210 A | 7/2000 | Cobb et al. |
| 6,377,349 B1 | 4/2002 | Fercher |
| 6,483,590 B1* | 11/2002 | Davis .................. G01N 21/474 356/445 |
| 6,532,321 B1 | 3/2003 | Zhang et al. |
| 6,909,549 B1 | 7/2005 | Hsiech et al. |
| 10,811,158 B1* | 10/2020 | Chen ...................... H01J 65/04 |
| 2003/0048441 A1 | 3/2003 | Manning |
| 2005/0006590 A1 | 1/2005 | Harrison |
| 2005/0185193 A1 | 8/2005 | Schluchter et al. |
| 2015/0185135 A1 | 7/2015 | Martino |
| 2016/0146722 A1 | 5/2016 | Koerner et al. |
| 2019/0277760 A1 | 9/2019 | Shawgo et al. |

FOREIGN PATENT DOCUMENTS

| | | |
|---|---|---|
| JP | H10253527 A | 9/1998 |
| RU | 2018122 C1 | 8/1994 |

OTHER PUBLICATIONS

Nijnaitten et al. "Directional Reflection Measurements on Highly Reflecting Coats" 7th International Converence on Coating on Glass and Plastics; 2007 (7 pages).

Castellini et al. "Characterication and Calibration of a Variable-Angle Absolute Reflectometer" Applied Optics; 1990 (6 pages).

"Variable Angle Reflection Accessory" Harrick Scientific Products, accessed Mar. 7, 2018 (1 page).

"Near-Normal and Large Angle Regular Reflectance Calibrations" National Physical Laboratory, accessed Mar. 7, 2018 (3 pages).

"Absolute Reflectance Accessory" Pike Technologies, Accessed Mar. 7, 2018 (2 pages).

STORM "Absolute Specular Reflectance Measurements at Fixed Angles" Labsphere Corporation; 1998 (4 pages).

"Absolute Calibration of Regular Reflectance Standards for the Thermal Infrared" accessed Mar. 7, 2018 (3 pages).

"Comparison of Absolute Reflectance Methods: VW vs Reflectance Relative to a Standard" Harrick Scientific Products (2 pages).

"The Variable Angle Reflection Accessory" Harrick Scientific Products (2 pages).

* cited by examiner

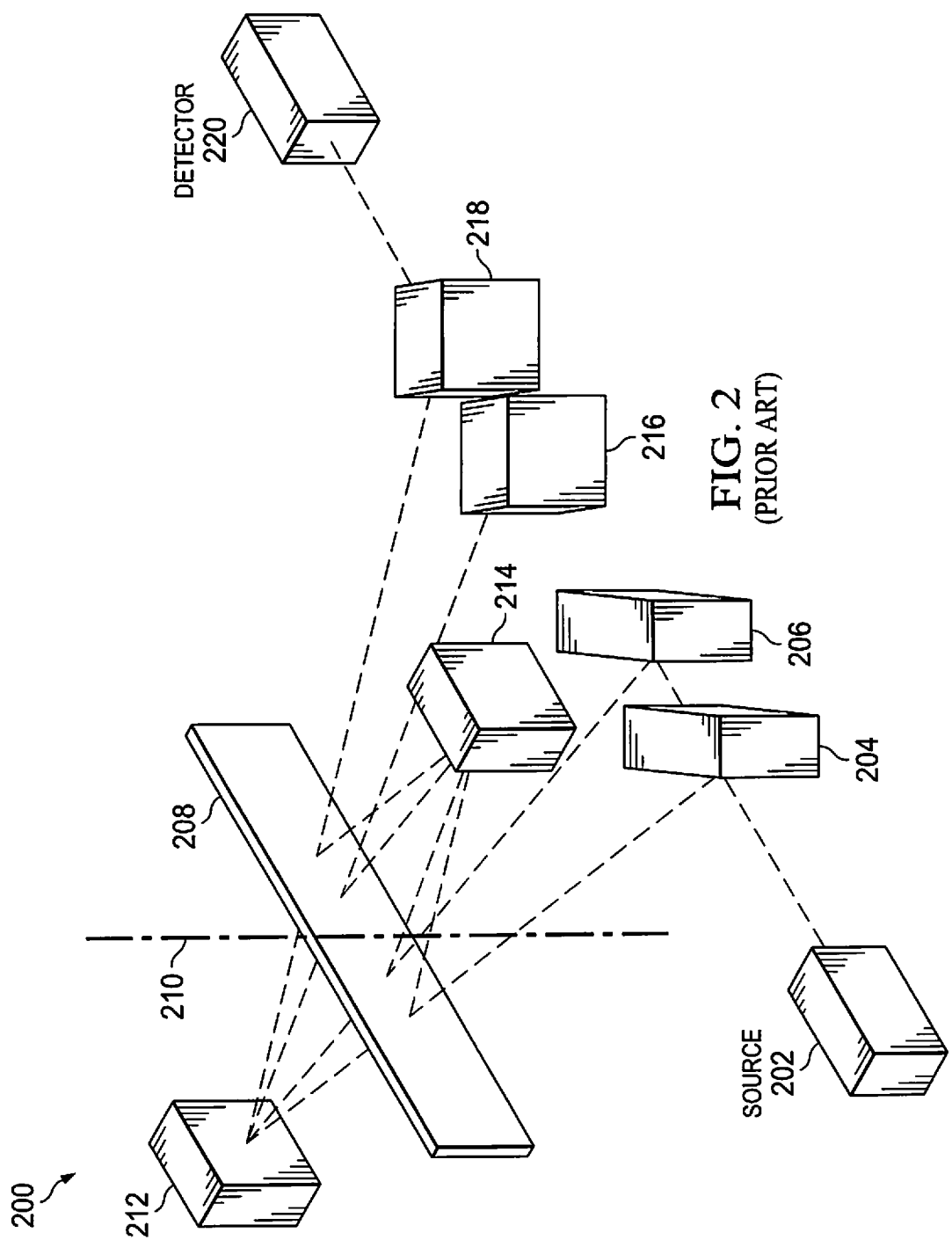

SPECULAR VARIABLE ANGLE ABSOLUTE REFLECTANCE METHOD AND REFLECTOMETER

BACKGROUND

The subject matter herein relates generally to methods and devices for specular variable angle absolute reflectance.

Specular reflectance refers to the reflection of light from a surface, such as a mirror, in which light from an incoming direction is reflected into an outgoing direction. Thus, specular reflectance is a behavior of light which can be measured using optical equipment. Specular reflectance measurement of materials is one way of determining the composition or other chemical, thermal or optical characteristics of the sample material.

Precise absolute measurement of specular reflectance has several applications. For example, this technique is used to establish reference standards for other types of reflectance measurements and for calibration of optical measurement devices. In another example, this technique is used in the optical coating industry to develop coatings, for example, mirrors in order to increase the mirror's optical efficiency. In still another example, precise absolute measurement of specular reflectance can be used to measure the thickness or refractive index of a single layer of an optical coating.

However, measurement of absolute specular reflectance is difficult when it is desirable to quickly test a broad range of incident angles, light wavelengths, and light polarizations. Specular reflectance measurement devices have difficulty in aligning the components and the sample for accurate measurement. Additionally, specular reflectance measurement devices have difficulty focusing the light beam at the sample and at the detector. For example, the light beams tend to disperse along the length of the light beam. For example, some specular reflectance measurement devices use laser light sources. Improved techniques for measuring absolute specular reflectance are desirable. For example, devices having enhanced alignment mechanisms and techniques for the components and the sample for improved reflectance measurements are desirable. Devices having focused beam paths and spot size on the sample are desirable. Devices implementing extended area sources are desirable.

BRIEF DESCRIPTION

The illustrative embodiments provide for a specular variable angle absolute reflectometer. The specular variable angle absolute reflectometer includes a light source and a mirror system in a light path of the light source. The mirror system is configured to reflect a light beam from the light source towards a sample that is optically reflective. The specular variable angle absolute reflectometer also includes an elliptical roof mirror disposed in the light path after the sample. The elliptical roof mirror is configured to reflect the light beam back towards the sample. The sample is located at the foci of an elliptical reflective surface of the elliptical roof mirror and the elliptical reflective surface refocuses the light beam at the sample. The specular variable angle absolute reflectometer also includes a mechanism connected to the elliptical roof mirror. The mechanism is configured to rotate the elliptical roof mirror about an axis of the sample. The specular variable angle absolute reflectometer also includes a detector in the light path after the elliptical roof mirror such that the detector receives light that has been reflected from the elliptical roof mirror, thence back to the sample, thence back to the mirror system, and thence to the detector.

The illustrative embodiments also provide for a method of measuring a reflectance of a sample having a sample axis. The method includes projecting a light beam from a light source towards a mirror system. The method also includes thereafter reflecting the light beam from the mirror system towards the sample. The sample is rotated by a first angle about the sample axis. The method also includes, thereafter, reflecting the light beam from the sample towards an elliptical roof mirror, the elliptical roof mirror rotated by a second angle about the sample axis. The second angle is about twice the first angle. The method also includes, thereafter, reflecting the light beam from the elliptical roof mirror back towards the sample. The method also includes, thereafter, reflecting the light beam from the sample back towards the mirror system. The method also includes, thereafter, reflecting the light beam from the mirror system towards a detector, whereby a modified light beam is generated. The method also includes calculating the reflectance of the sample based on optical properties of the modified light beam as detected by the detector.

The illustrative embodiments also provide for a method of using a specular variable angle absolute reflectometer comprising a light source; a mirror system in a light path of the light source, the mirror system configured to reflect a light beam from the light source towards a sample that is optically reflective; an elliptical roof mirror disposed in the light path after the sample, the elliptical roof mirror configured to reflect the light beam back towards the sample; a mechanism connected to the elliptical roof mirror, the mechanism being configured to rotate the elliptical roof mirror about an axis of the sample; and a detector in the light path after the elliptical roof mirror such that the detector receives light that has been reflected from the elliptical roof mirror, thence back to the sample, thence back to the mirror system, and thence to the detector. The method includes removing the sample and verifying that a sample holder does not restrict the light beam. The method also includes aligning the elliptical roof mirror to a 100% configuration. The method also includes measuring a signal at the detector to form a 100% measured value. The method also includes measuring a total light source power at the detector. The method also includes, thereafter, moving a mirror system so that the light beam is projected into a light trap to interrupt the light source. The method also includes, thereafter, measuring a background noise at the detector. The method also includes, thereafter moving the mirror system back to receive the light beam. The method also includes replacing the sample into the path of the light beam. The method also includes rotating the sample to a desired incident angle. The method also includes rotating the elliptical roof mirror to a complimentary reflection angle. The method also includes measuring a sample reflection at the detector to form a measured value. The method also includes measuring a total light source power at the detector. The method also includes, thereafter, moving a mirror system so that the light beam is projected into a light trap to interrupt the light source. The method also includes, thereafter, measuring a background noise at the detector. The method also includes, thereafter, moving the mirror system back to receive the light beam. The method also includes calculating a reflectance of the sample as a ratio of the 100% measured value with background compensation. The method also includes calculating an absolute reflectance of the sample as the square root of the reflectance to the 100% measured value.

BRIEF DESCRIPTION OF THE DRAWINGS

FIG. 2 illustrates a prior art overlaid "V-W" components and beam path for a 10 degree and a 20 degree angle of incidence for both 100% reflectance measurement and a sample reflectance measurement;

DETAILED DESCRIPTION

Figure 1A:
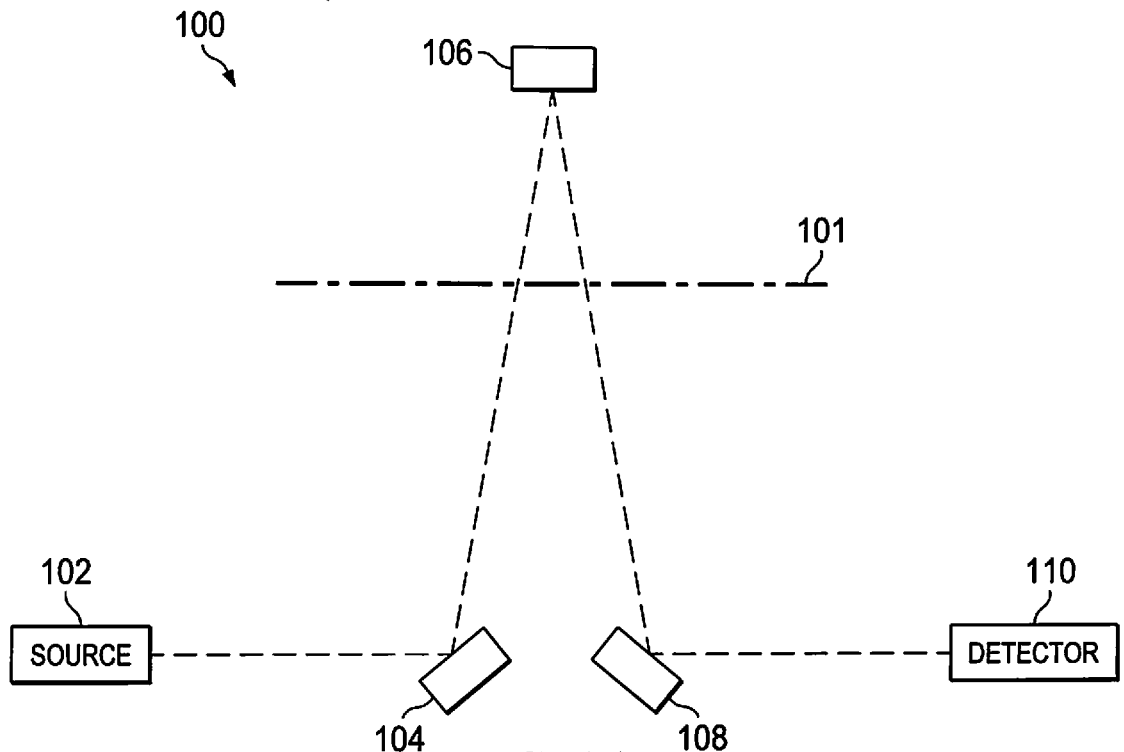
FIG. 1A illustrates a prior art a 10 degree "V" configuration optical path for performing a 100% reflectance measurement.

The illustrative embodiments recognize and take into account that precise absolute measurement of specular reflectance has several applications. First, and perhaps most widely used, this technique is used to establish reference standards for other types of reflectance measurement and for calibration of measurement devices. Most measurement instruments require a known reflectance standard to establish the baseline system throughput or the 100% reflectance level. In other words, the 100% reflectance level is defined as the reflectance measured when the sample is not measured; or, the reflectance of only the components in the reflectometer. Not all of the known measurement systems use the same incident angle, some are variable.

The illustrative embodiments recognize and take into account that these known techniques depend on reference standards with variable wavelength, angle of incidence of the light beam, and polarization capability of the reflectometer. Thus, the specular variable angle absolute reflectometer (SVAAR) of the illustrative embodiments provide for an absolute measurement technique and reflectometer that can establish those levels independent of any reference standards with variable wavelength, angle of incidence, and polarization capability.

The illustrative embodiments also recognize and take into account that another application is in the optical coating industry. For instance, laser mirrors require very efficient, highly reflective coatings to maximize reflectance and minimize heating due to absorption. These high efficiency mirror coatings are typically multi-layer dielectric stacks designed for a specific incident angle and perhaps for a specific wavelength of light. Dielectric coatings can vary in performance from their original design due to uncertainties in the thickness or composition of each coating layer. These variations in thickness or composition can affect the reflectance value and polarization of the reflected light.

Witness samples are typically included in each coating run and measured to verify that the coating batch meets the desired coating performance standards. Often laser mirror reflectivity is greater than 99.98%, for example, at a specific laser wavelength and design angle, although the mirror manufacturer or user may want to determine the absolute reflectance at angles and polarizations outside of the limited design angle (in the case of off the shelf mirror coatings used at a non-design angle). For this type of measurement, use of a reference standard with the added uncertainty would increase the coating measurement uncertainty. In addition, the reflectometer of the illustrative embodiments can characterize the polarization effects of the coating. The reflectometer of the illustrative embodiments also can support either broadband mirror measurement or measurement at specific wavelengths, including laser lines along with multiple angles and polarizations.

The illustrative embodiments also recognize and take into account that one other application is in the measurement of single layer coating thickness or refractive index. One technique for measuring contamination in vacuum chambers is to place a reflective witness sample in the vacuum chamber during some process or procedure. For example, during satellite testing, often components give off volatile substances when under vacuum, particularly when heated, such as during a thermal or operational test. Contaminants condense on the mirrored witness sample during the procedure. The witness samples could be measured in the reflectometer of the illustrative embodiments, and the contaminant layer thickness or refractive index derived from the reflected polarization changes at specific angles and wavelengths.

The illustrative embodiments also recognize and take into account that reflectance or transmittance measurement of materials is one way of determining the composition or other chemical, thermal or optical characteristics of a test substance. The illustrative embodiments specifically contemplate the measurement of various properties at optical (visible, near visible) or infrared (often called thermal infrared) wavelengths of light. Typically, optical measurements are the ratio of the test sample amplitude to that of a known, well characterized 'reference' or 'standard' or 'reference standard' workpiece. However, the accuracy of these relative measurements is limited to the accuracy of the 'reference standard', which, in many cases, was calibrated against other 'reference standards'. Each level of the calibration process adds uncertainty to the accuracy of our working 'reference standard', often resulting in large uncertainties. Accordingly, in some cases, the 'reference standard' becomes nearly useless. As an example, if a purchased reference standard had an accuracy with an uncertainty of +/−4%, the reference standard would not help in making a measurement with a +/−1% measurement accuracy.

The illustrative embodiments also recognize and take into account that, ideally, 'reference standards' used in optical measurement would be measured via an 'absolute' measurement technique which does not use a comparison to a known standard as the source of accuracy. The illustrative embodiments also recognize and take into account that there are techniques currently used to measure reflectance using 'absolute' techniques, but they have practical limitations. One major limitation is in the range of incident angles that the technique covers. Other limitations of known techniques include sample size that are too large for a given test, or system alignment problems. For example, devices currently used have diverging cones of light beams, greatly increasing the required sample size needed for the reflected bounce spot for the light and requiring large light collecting optics for detection.

Thus, the illustrative embodiments provide a measurement technique capable of accurately measuring an absolute reflectance of specular samples across a broad range of incident angles, wavelengths, and polarizations relatively quickly. The illustrative embodiments also provide for absolute reflectance measurements in infrared wavelengths. The illustrative embodiments also recognize and take into account that recognize and take into account that there are few, if any, absolute reflectance standards available at the thermal infrared wavelengths.

For most reflectance standards, reflectance versus angle and polarization is derived from the basic optical properties of the reflective material. For example, an optical system could use a polished copper plate for which basic optical properties are widely accepted, but not over the full range of calibration wavelengths. Extrapolation and interpolation of values from multiple sources are used in the derivation of reflectance versus wavelength, polarization, and angle. For such a system, it is also unclear what alloys of copper for which the accepted optical properties would be valid.

To summarize, the illustrative embodiments have several advantages over the known art. The illustrative embodiments can perform absolute reflectance measurements of specular samples at variable angles, polarizations, and wavelengths, whereas prior reflectometers cannot. One unique feature of the illustrative embodiments is the use of an elliptical roof mirror. The elliptical roof mirror has an ellipsoidal reflective surface for reflecting the light beam back toward the sample and the detector. The ellipsoidal reflective surface focuses the reflected light beam at the sample surface. The elliptical roof mirror can rotate about the sample rotation axis at twice the angular distance as the sample incidence. The sample rotation axis lies on the sample surface. The incident angle of light on the sample is measured relative to the sample normal (a line perpendicular to the sample surface).

A second unique feature of the illustrative embodiments is the shape of the ellipsoidal reflective surface and the positioning of the ellipsoidal reflective surface from the sample, which allows the first and second reflections from the sample to be coincident. A third unique feature of the illustrative embodiments is the ability to sequentially measure the sample, the laser power, and the background light level to compensate for source drift and background conditions. A fourth unique feature of the illustrative embodiments is that the measured foot print is limited to the extent of the beam diameter divided by the cosine of the incident angle. The beam can be focused at the detector to maximize signal and minimize alignment criticality. A fifth unique feature of the illustrative embodiments is that this measurement technique uses the same optical path and optical components during both the 100% measurement stage and the sample measurement stage. The ratio of the sample to the 100% is an absolute measure of the square of the sample reflectance.

Thus, the illustrative embodiments provide for a specular variable angle absolute reflectance method and reflectometer that has numerous advantages over the known art. Attention is now turned to the figures.

Figure 1B:
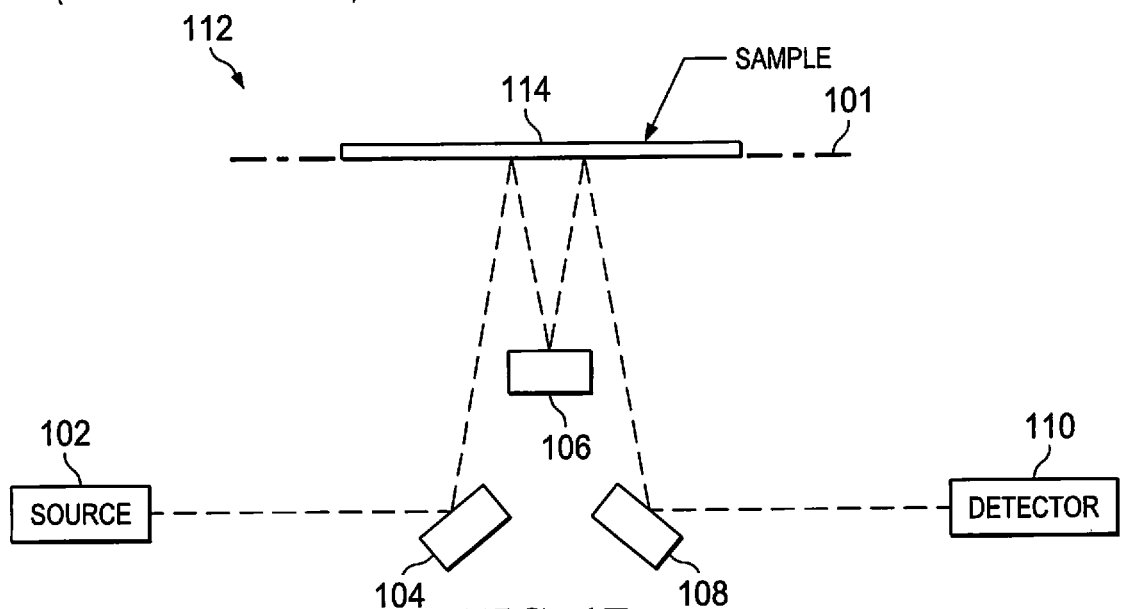
FIG. 1B illustrates a prior art 10 degree "W" configuration optical path for performing a reflectance measurement of a sample.

FIG. 1A illustrates a prior art a 10 degree "V" configuration optical path for performing a 100% reflectance measurement. FIG. 1B illustrates a prior art 10 degree "W" configuration optical path for performing a reflectance measurement of a sample. FIG. 1A and FIG. 1B should be read together. The lines in FIG. 1A and FIG. 1B show the light path, though dashed line 101 is an axis of sample 114.

The "V" configuration 100 shown in FIG. 1A is used to measure a 100% reflectivity of the optical reflectometer, which includes light source 102, mirror 104, and mirror 106, mirror 108, and detector 110. The term "100%" reflectivity is used because the sample is not present, and the sample would reduce reflectivity at least by a small amount when the sample is present in the reflectometer. Without a sample being present, the maximum possible reflectivity for the system is achieved, and this maximum possible reflected is considered "100% reflectivity", or simply "100%".

The "W" configuration 112 shown in FIG. 1B adds sample 114 into the reflectometer shown in FIG. 1A, in a "W" arrangement of the light path between sample 114 and mirror 106. The reflectivity of the system is calculated again and compared to the 100% reflectivity, thereby determining the reflectivity of sample 114.

Thus, FIG. 1A and FIG. 1B represent a known method for measuring the absolute reflectance of specular samples. This method is referred-to as the 'V-W' absolute reflectance measurement accessory, which is commercially available for many spectrophotometers and Fourier Transform Infrared (FTIR) measurement systems. The reason for the 'V' and 'W' name is fairly obvious from FIG. 1A and FIG. 1B, which show the '100%' and the 'Sample' measurement paths. The 'absolute' measurement capability is derived from the use of the same three mirrors used for the '100%' value in the 'V' configuration being used when measuring the sample in the 'W' configuration. Since the only change to the optical path is the addition of the sample, the ratio of the 'W'/'V' values are the absolute reflectance ratio directly attributable to the sample reflectance. Note, however, that there are two reflections or 'bounces' from the sample. Since the measured value is the result of $R_{sample}*R_{sample}$ then the Reflectance of the sample, or $R_{sample}$ is equal to the square root of ('W'/'V'). This relationship helps to increase the accuracy of the sample reflectance measurement.

FIG. 2 illustrates a prior art overlaid "V-W" components and beam path for 10 degree and 20 degree angle of incidence for both 100% reflectance measurement and a sample reflectance measurement, in accordance with an illustrative embodiment. "V-W" arrangement 200 shown in FIG. 2 is a variation or a combination of "V" configuration 100 of FIG. 1A and "W" configuration 112 of FIG. 1B. The reflectometer of "V-W" arrangement 200 includes light source 202, mirror 204, mirror 206, sample 208, sample axis 210, mirror 212, mirror 214, mirror 216, mirror 218, and detector 220.

The technique described in FIG. 1A and FIG. 1B, as well as FIG. 2, is limited in its ability to vary the angle of incidence. Typically, the reflectometer is configured for a single incident angle of 10°+/− and is not intended to be varied. The sample incident angle is the degree which sample 208 is rotated about sample axis 210 relative to the incident light. Thus, the sample incident angle is the angle between the incoming light source ray and the normal line of the sample at the intersection of the ray with the sample. Another way of defining the sample incident angle would be that it is half the angle between the incident and reflected rays at the intersection with the sample.

FIG. 2 illustrates one of the issues with changing and increasing the incident angle and increased sample size, or beam footprint, and the need to relocate the source and detector mirrors. An incident angle of 20° is the largest incident angle shown. At much larger incidence angles, the sample size requirement becomes significant and often unworkable. In addition, relocating and realigning the mirrors is a significant time commitment. Even at the 10° incident angle, the sample size required exceeds a standard 1" size dimension. Thus, the prior art reflectometer technique described with respect to FIG. 1A, FIG. 1B, and FIG. 2 suffers from drawbacks that are addressed by the illustrative embodiments, as described further below.

Figure 3:
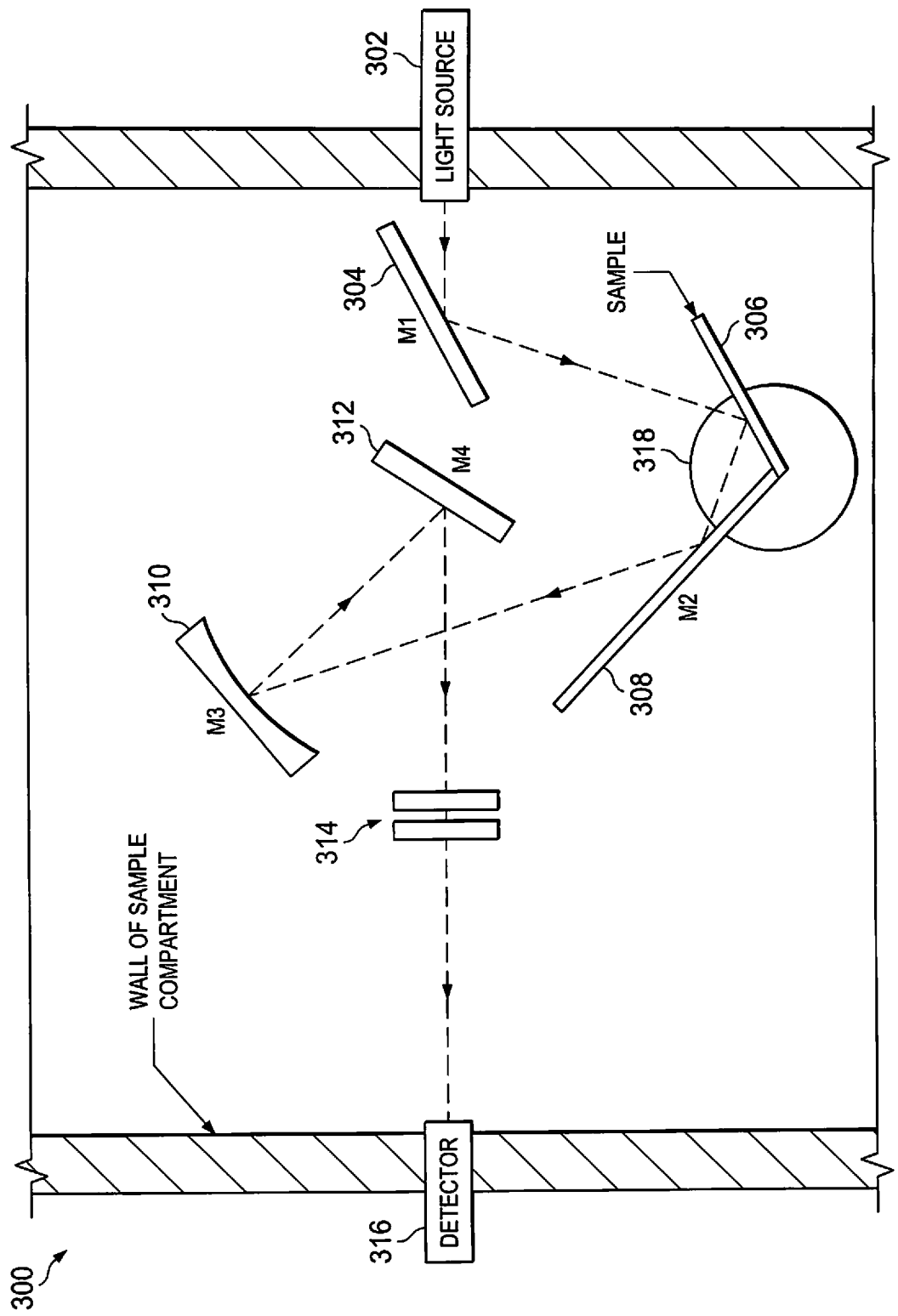
FIG. 3 illustrates a prior art method for a variable angle reflectance sample measurement.

FIG. 3 illustrates a prior art method for a variable angle reflectance sample measurement, in accordance with an illustrative embodiment. Reflectometer system 300 includes light source 302, mirror M1 304, sample 306, mirror M2 308, mirror M3 310, mirror M4 312, polarizer pair 314, and detector 316. Sample 306 and mirror M2 308 can rotate with rotatable platform 318, which may include a mirror aperture. The arrows and lines in FIG. 3 represent the light path taken by the beam emitted by light source 302.

Harrick Scientific Corp of Pleasantville, N.Y., makes a variable measurement system, shown in FIG. 3, that may be used to perform the variable angle measurement of specular reflection. In other words, FIG. 3 is an illustration of the Harrick Scientific Corp. variable angle reflectometer.

A sequence of scans similar to that used for the near-normal reflectance is carried out using this instrument to obtain a relative value. As with a near-normal case, the relative value is multiplied by the absolute reflectance of the reference standard at the same angle and polarization to obtain an absolute calibration. In order to obtain an absolute calibration of reference standard mirrors, the mirrors are calibrated at near-normal angle to give an absolute calibration.

However, this technique is not a direct absolute measurement; rather, it is a derived absolute versus angle of a reference standard based on an absolute value measured at a single angle (via a 'V-W' technique) and correlated to a variable measurement at the same angle. Through literature provided and fitted optical constants, reference values are provided at larger angles. To summarize, the variable angle measurements are based on a reference standard with hybrid reflectance derived from a single measured absolute angle and polarization projected to other angles and polarizations based on published and fitted optical constants.

A limitation to the variable angle technique shown in FIG. 3 is the need for a fairly limited sample size. Sample size is limited in maximum thickness as well as minimum and maximum height and width. For samples of fixed sizes outside of these ranges, a different instrument would have to be used.

Figure 4:
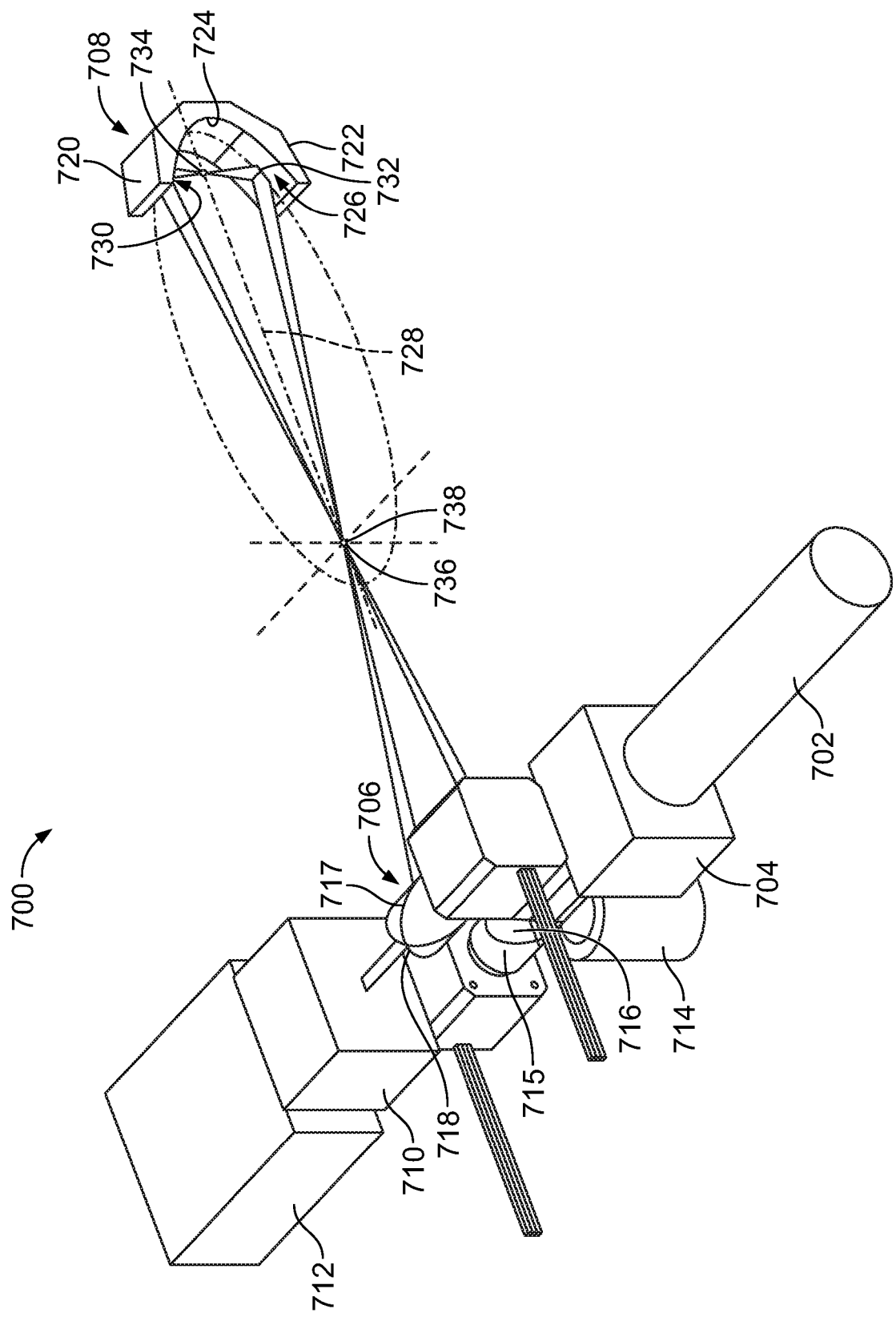
FIG. 4 illustrates a specular variable angle absolute reflectometer in a 100% reflectance measurement configuration, in accordance with an illustrative embodiment.
Figure 5:
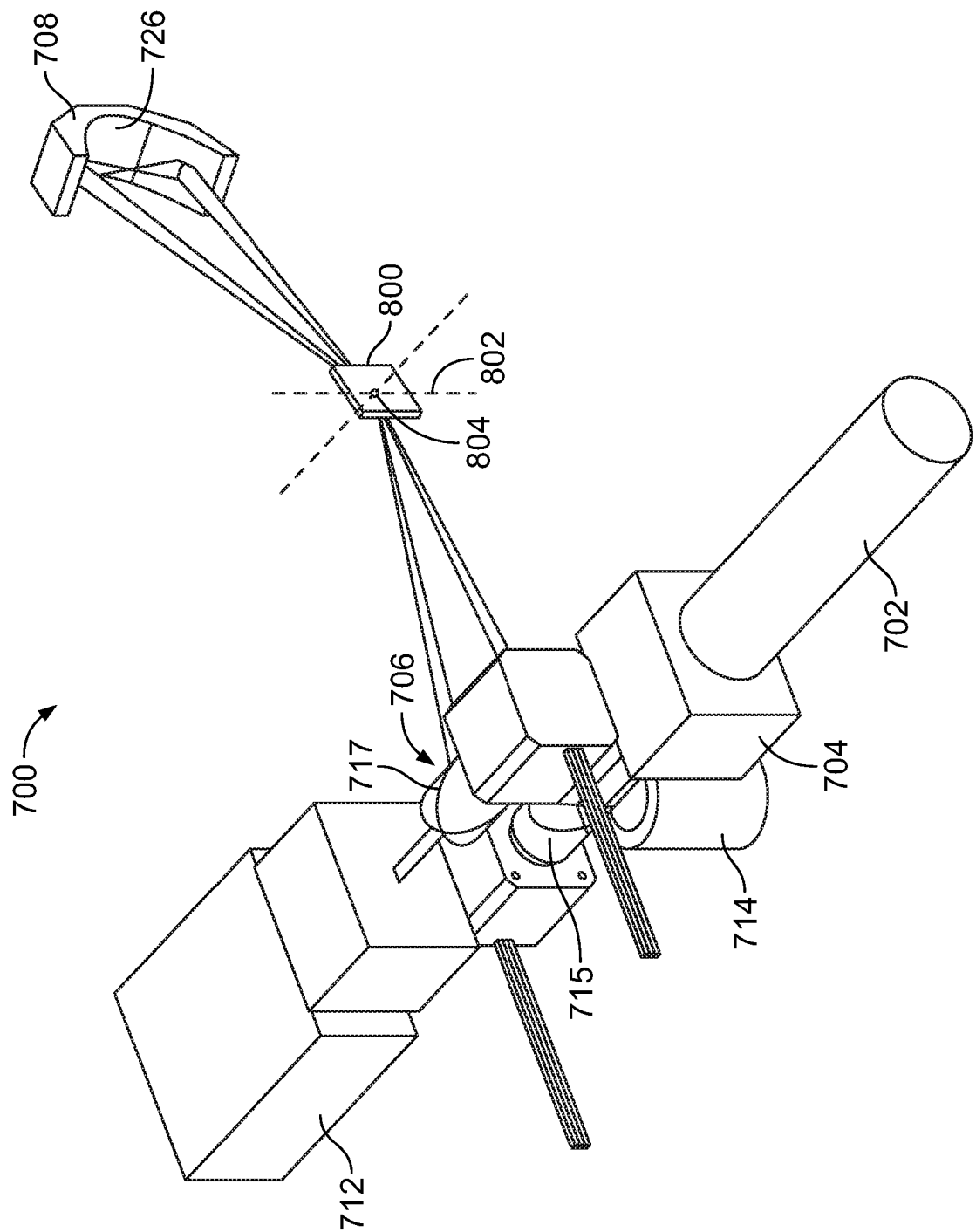
FIG. 5 illustrates a specular variable angle absolute reflectometer in a 15 degree configuration for sample reflectivity measurement, in accordance with an illustrative embodiment.
Figure 6:
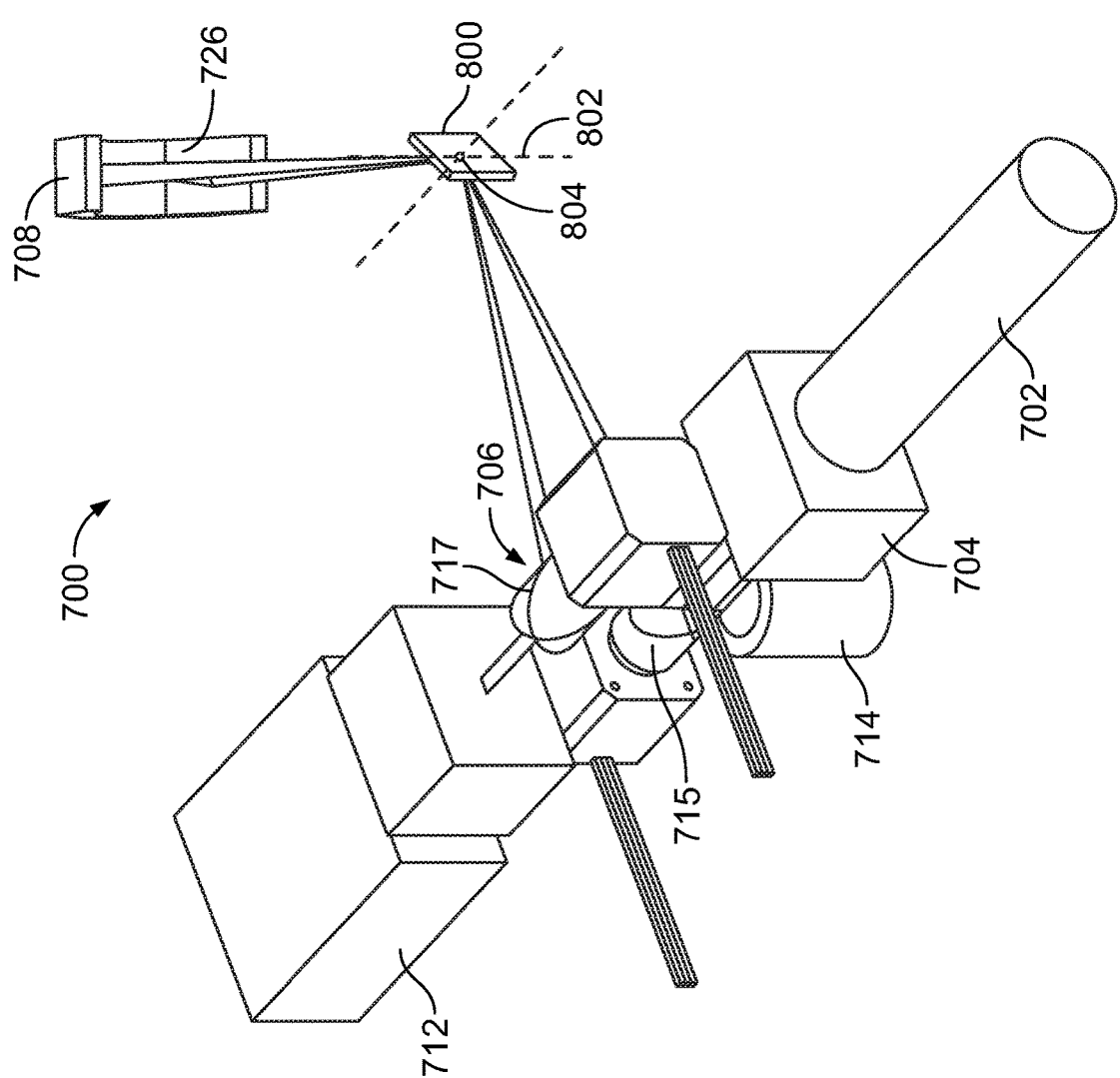
FIG. 6 illustrates a specular variable angle absolute reflectometer in a 30 degree configuration for sample reflectivity measurement, in accordance with an illustrative embodiment.

FIG. 4 illustrates a specular variable angle absolute reflectometer 700 in accordance with an exemplary embodiment for measuring reflectance of a sample 800 (shown in FIGS. 5 and 6). The specular variable angle absolute reflectometer 700 is illustrated in a 100% reflectance measurement configuration. FIG. 4 represents a substantial improvement over the prior art reflectometers shown in FIG. 1 through FIG. 3.

Specular variable angle absolute reflectometer 700 includes light source 702, optional polarizer 704, mirror system 706, elliptical roof mirror 708, optional polarizer 710, detector 712, and optional light trap 714. Another term for elliptical roof mirror 708 is "elliptical roof reflector." The sample 800 is deliberately omitted from FIG. 4 because FIG. 4 illustrates a calibration or 100% reflectivity configuration. However, sample axis 802 is shown as dashed lines where the sample would be placed for later sample measurement. Again, sample axis 802 lies on the face of the sample, or the sample surface. The rest of the lines shown in FIG. 4 represent the light path of the light beam. Various sections of the light beam may be convergent or divergent.

Specular variable angle absolute reflectometer 700 has a number of advantages over the traditional 'V', 'W', and the "V-W" type of angular reflectometers shown in FIG. 1A, FIG. 1B, FIG. 2, and FIG. 3. Specular variable angle absolute reflectometer 700 provides multi-bounce absolute reflectance at variable angles and polarizations for samples with minimal size restrictions.

In an exemplary embodiment, the specular variable angle absolute reflectometer 700 includes the elliptical roof mirror 708. The mirror system 706 and the elliptical roof mirror 708 are arranged to provide an incident beam and a return beam that are coincident at the sample (for example, at the sample axis 802). In an exemplary embodiment, the incident beam and the return beam are in a vertical plane; however, other orientations are possible in alternative embodiments. The elliptical roof mirror 708 provides first and second bounces of the light beam to redirect the return beam at the sample.

For illustration purposes and as one suggested source, a wavelength tunable laser is shown with optional polarization control and a polarization analyzer via polarizer 704 and polarizer 710. However, both polarizers are optional. Additionally, light source 702 need not be a wavelength tunable laser, but may be a fixed wavelength laser, a single line laser, a broadband source, a light emitting diode source, a filtered broadband source, a solar light simulator, actual solar light directed into the system, or any other appropriate light source for an intended measurement configuration.

The elliptical roof mirror 708 includes an upper portion 720 and a lower portion 722. The upper portion 720 and the lower portion 722 meet at a vertex 724 of the elliptical roof mirror 708. The elliptical roof mirror 708 includes an ellipsoidal reflector surface 726 along an interior of the upper portion 720 and the lower portion 722. The ellipsoidal reflector surface 726 is defined by a curved surface, such as a continuous curve, extending between a top and a bottom of the elliptical roof mirror 708. The ellipsoidal reflector surface 726 is concave between the upper portion 720 and the lower portion 722. The ellipsoidal reflector surface 726 is configured to face the sample 800. The vertex 724 is provided along a major axis 728 of the ellipse defining the ellipsoidal reflector surface 726.

An ellipse, in two dimensions, is a closed object with two foci such that the sum of the distance from any point on the ellipse to the foci is constant. An ellipsoid is a solid of rotation about an axis through the two foci. The ellipsoidal reflector surface 726 is defined by the ellipsoid being cut off at a front and sides to form the ellipsoidal reflector surface 726. The ellipsoidal reflector surface 726 is a hollow surface where the interior of the surface is reflective. The ellipsoidal reflector surface 726 is curved from the top to the bottom and from the side to the opposite side to control the reflection direction for the light beam. The ellipsoidal shape of the ellipsoidal reflector surface 726 removes an alignment control degree of freedom for focusing the light beam at the sample 800. The ellipsoidal reflector surface 726 has the ellipsoidal shape, rather than having flat faces, to control the beam spot location and the beam spot size at the sample. Passing the light beam through one focus of the internally reflective ellipsoid will necessarily pass the light beam through the other focus. The ellipsoidal reflector surface 726 is used to re-direct the light beam reflected from the sample 800 back at the sample 800. The ellipsoidal reflector surface 726 contains one focus of the ellipse with the second focus at the measurement point of the sample 800 such that any rays reflected from the sample 800 in the direction of the elliptical roof reflector 708 will be reflected and refocused back onto the sample 800 at the same focus point. The elliptical roof mirror 708 performs absolute reflectance measurements of specular samples at variable angles, polarizations and wavelengths.

The ellipsoidal reflector surface 726 is shaped to reflect the light beam back toward the detector 712 and the sample 800. In an exemplary embodiment, the ellipsoidal reflector surface 726 is configured to converge the light beam at a coincident beam spot 804 at the sample 800. For example, as the light beam is reflected from the ellipsoidal reflector surface 726, the light beam is focused at the foci of the ellipse used to define the ellipsoidal reflector surface 726. The sample 800 is configured to be positioned at one of the foci (the distal foci) such that the light beam converges toward the sample 800.

The ellipsoidal reflector surface 726 includes a first beam spot 730 and a second beam spot 732. In the illustrated embodiment, the first beam spot 730 is provided on the upper portion 720 and the second beam spot 732 is provided on the lower portion 722. The light beam is configured to be directed from the light source 702 and/or the sample 800 (when present) to the first beam spot 730. The light beam is directed from the first beam spot 730 to the second beam spot 732. The light beam is directed from the second beam spot 732 back toward the sample 800 and/or the detector 712. In an exemplary embodiment, the first and second beam spots 730, 732 are axially aligned with a first foci 734 of the ellipse defining the ellipsoidal reflector surface 726. In an exemplary embodiment, the sample 800 is configured to be axially aligned with a second foci 736 of the ellipse defining the ellipsoidal reflector surface 726. The ellipsoidal reflector surface 726 is configured to converge the light beam to a beam spot 738 at the second foci 736 at the sample 800. As such, the system may use a small sample size and may use smaller light collecting optics at the detector 712.

There are a variety of configurations that can be used for source and detector steering. The configuration shown in FIG. 4 is proposed as the 100% measurement or system 100% value. This arrangement corresponds to the 'V' configuration measured value in the 'V-W' system shown in FIG. 1 or FIG. 2, though of course the prior art systems do not include elliptical roof mirror 708 or the arrangement of mirror system 706.

Mirror system 706 in FIG. 4 is shown as including a first mirror 715 having a first face 716 and a second mirror 717 having a second face 718. Each face 716, 718 is mirrored in order to reflect the light beam. However, mirror system 706 may be different mirror systems, such as having a single block or a single mirror having two faces shown, for example, in FIGS. 7 through FIG. 8. Additionally, mirror system 706 may have more than two mirrors, depending on the desired arrangement for a particular application.

FIG. 5 illustrates the specular variable angle absolute reflectometer 700 in a 15 degree configuration for sample reflectivity measurement, in accordance with an illustrative embodiment. FIG. 6 illustrates the specular variable angle absolute reflectometer 700 in a 30 degree configuration for sample reflectivity measurement, in accordance with an illustrative embodiment. FIGS. 5 and 6 illustrate the sample 800 arranged at the sample axis 802. A sample mount with a flat face or three-point ball locations can be fabricated to position the sample face at a plane containing the sample axis 802. Left, right, up, and down positioning of sample 800 is not critical so long as the largest incident laser spot is contained within sample 800. Kinematic base mounts are another alternative.

The elliptical roof mirror 708 is rotated to twice the desired sample incident angle in the same direction as light source 702 to intercept and return the reflected beam. FIG. 5 illustrates the elliptical roof mirror 708 rotated about sample axis 802 to a 30 degree measurement orientation and the sample 800 rotated about the sample axis 802 to a corresponding 15 degree measurement orientation or grazing angle. FIG. 6 illustrates the elliptical roof mirror 708 rotated about sample axis 802 to the 60 degree measurement orientation and the sample 800 rotated about the sample axis 802 to a corresponding 30 degree measurement orientation or grazing angle. The grazing angle is the angle of the elliptical roof mirror 708 from the face of the sample 800. The measurement orientation angle of the elliptical roof mirror 708 are at a complementary angle relative to the sample face. The measurement orientation angle of the elliptical roof mirror 708 and the sample measurement orientation angle are measured from the 100% position.

If one considers sample 800 facing light source 702 and detector 712 and the sample 800 normally parallel to both the light source and detector as zero, the sample incident angle can be achieved by turning either clockwise or counterclockwise by the desired incident angle. If one considers the elliptical roof mirror angular position to be 180° when elliptical roof mirror 708 is in the calibration, or 100% configuration, as shown in FIG. 4, the elliptical roof mirror angle is zero when elliptical roof mirror 708 is positioned between the source beam and the detector beam nearest to detector 712 and light source 702. One method for removing the sample from the optical path for performing a 100% measurement may be as follows. If elliptical roof mirror 708 and sample 800 are coupled, elliptical roof mirror 708 will be at 180° in the 100% position, or calibration position, when the sample angle of incidence is 90°. This arrangement makes the sample face parallel to the source beam and return beam. Sample 800 would only have to be moved by about half the beam diameter to be clear of the beam. A fixed cam or other mechanical or electromechanical means could push the sample mount backward, relative to the sample face normal. This procedure would also include sample 800 being mounted on a linear translation stage parallel with the sample normal.

The elliptical roof mirror 708 is configured to be rotated about sample axis 802 for measuring the reflectance of the sample 800 at various measurement angles. The elliptical roof mirror 708 may be moved using a movement device, such as but not limited to an electromechanical motor, a moveable mount holding elliptical roof mirror 708, a series of gears or knobs, or any convenient mechanical mechanism for rotating elliptical roof mirror 708 about sample axis 802.

In the illustrative embodiment shown in FIG. 5, elliptical roof mirror 708 is rotated through a 30 degree angle about sample axis 802 relative to a 0 degree reference which is the direction of the light path shown in FIG. 4. Sample 800 is placed with the sample face at sample axis 802, with the sample face towards light source 702 and detector 712, sample 800 is rotated to the desired incident angle. In this case, sample 800 is rotated 15° counterclockwise from the light beam. Elliptical roof mirror 708 is rotated to intercept the reflected beam and redirect the reflected beam for a second reflection off of the sample 800, as shown in FIG. 5.

In the illustrative embodiment shown in FIG. 6, elliptical roof mirror 708 is rotated through a 60 degree angle about sample axis 802 relative to the 0 degree reference. Sample 800 is placed with the sample face at sample axis 802, with the sample face towards light source 702 and detector 712, sample 800 is rotated to the desired incident angle. In this case, sample 800 is rotated 30° counterclockwise from the light beam. Elliptical roof mirror 708 is rotated to intercept the reflected beam and redirect the reflected beam for a second reflection off of the sample 800, as shown in FIG. 6.

Elliptical roof mirror 708 is rotated to twice the desired sample incident angle in the same direction as source 702 to intercept and return the reflected beam. Since these relative angular rates are fixed, a mechanical coupling between the two could be implemented or, for alignment versatility, rotational movements could be controlled independently.

In an exemplary embodiment, the beam spot size may be kept small on the sample, such as to keep the sample size relatively small. The footprint of the beam may change with changes in the sampling angle. The size of the beam footprint is the beam diameter divided by the cosine of the incident angle. Keeping the beam small minimizes the sample size requirement. In an exemplary embodiment, the mirror system 706 and the elliptical roof mirror 708 focus the beam at a coincident beam spot on the sample 800. The beam may be convergent at the sample 800 to reduce the footprint of the beam spot. The same optical path and optical components can be used during the 100% measurement and the sample measurement by controlling the position orientation of the mirror system 706, the elliptical roof mirror 708, and the sample 800. The system is used to sequentially measure the sample 800, the laser power and the background level to compensate for source drift and background conditions. The ratio of the sample measurement to the 100% measurement is an absolute measure of the square of the sample reflectance.

The light trap 714 is used to provide a zero measurement. The light trap 714 may be placed in or near mirror system 706 that would intercept the source output with corresponding movement of the mirror system 706. For example, the first mirror 715 may be rotated such that the first face 716 faces the light trap 714. The first mirror 715 may be moved by a motor, by a manual dial, or other convenient mechanical mechanism. In other various embodiments, the first mirror 715 may be moved in other movement directions, such as being translated. In other various embodiments, the first and second mirrors 715, 717 may be moved to allow for a source total power measurement. For example, the light beam may be directed from the light source 702 to the detector 712, either directly or by using the first and second mirrors 715, 717, without directing the light beam toward the elliptical roof reflector 708. The source total power is useful for compensating for any source drift over time. When the first mirror 715 is returned to a normal operating position, the light beam may be directed toward the sample 800 and the elliptical roof reflector 708 for a 100% level measurement (with sample removed) or for a sample measurement (with the sample in the light path).

The first and second mirrors 715, 717 may be mounted on a single mechanical device (motor and mount or other device) or may be mounted on individual mechanical devices (motor and mount or other device) to move the mirrors 715, 717. The mirror system 706 may be counter rotating to rotate the first and second mirrors 715, 717 and can be mechanically coupled to minimize control requirements or controlled independently if desired. The source zero level, provided by the use of light trap 714 can be accomplished by rotating the first and second mirrors 715, 717 of the mirror system 706 approximately 90° from the normal operating position.

In other various embodiments, a chopper could be introduced at the source output, before or after optional polarizer 704. The chopper may be used to extract the source and/or detector signal from the background noise caused by light leaks or light that scatters inside specular variable angle absolute reflectometer 700.

In an exemplary embodiment, the light beam is directed from the first mirror 715 toward the sample 800 and converges at the beam spot 804. The first face 716 is shaped to form the converging light beam to focus the light beam at the sample 800 to form a small diameter beam spot. In an exemplary embodiment, the light beam is directed from the ellipsoidal reflector surface 726 toward the sample 800 and converges at the beam spot 804. The ellipsoidal reflector surface 726 is shaped to form the converging light beam to focus the light beam at the sample 800 to form a small diameter beam spot.

Figure 7:
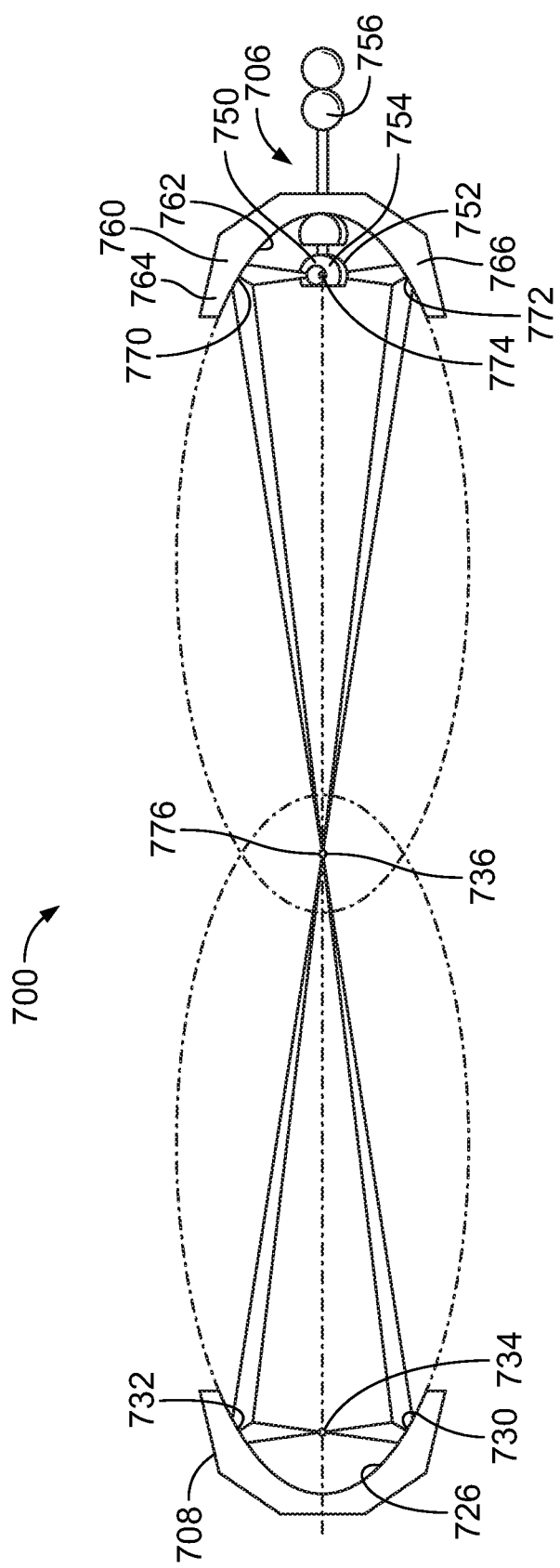
FIG. 7 is a side view of a specular variable angle absolute reflectometer in accordance with an illustrative embodiment.
Figure 8:
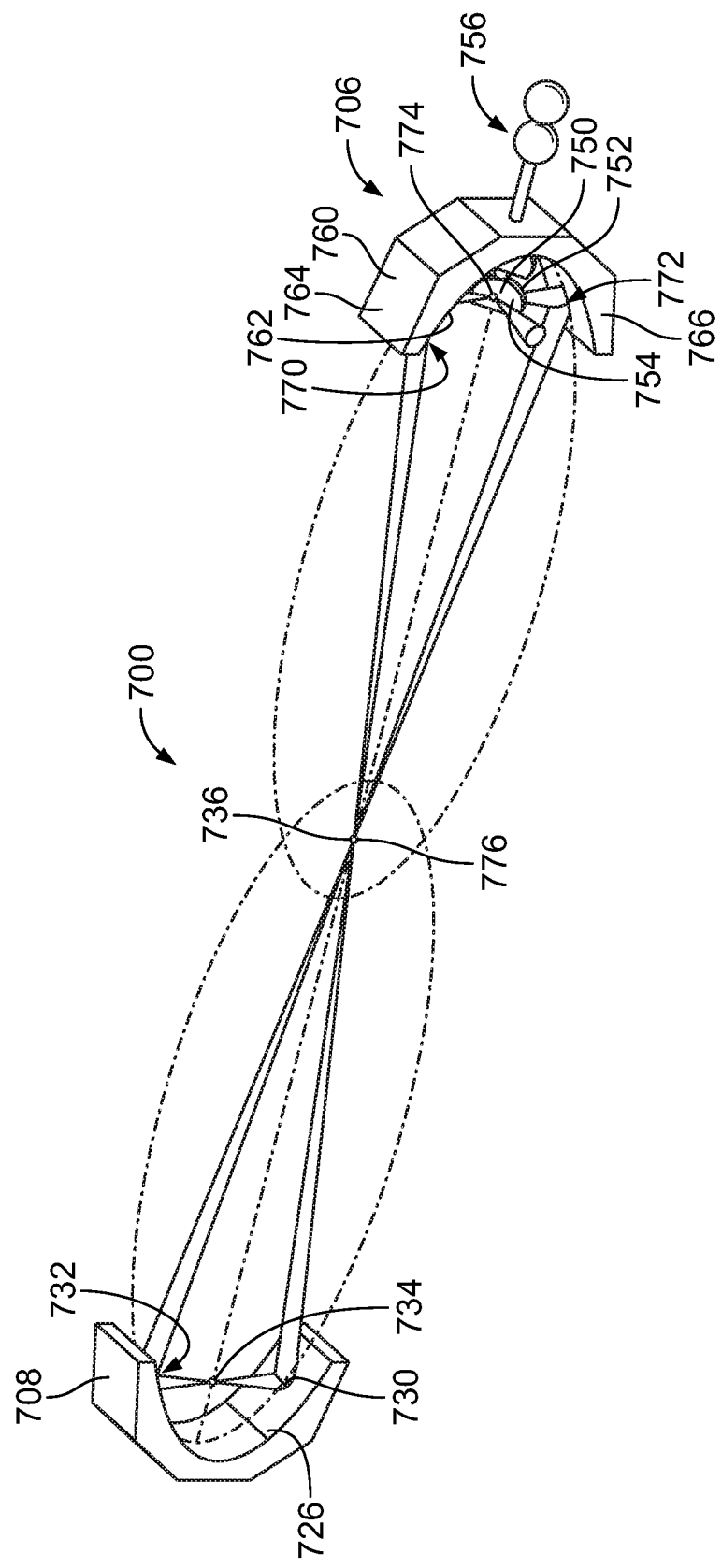
FIG. 8 is a perspective view of a specular variable angle absolute reflectometer in a 100% reflectance measurement configuration, in accordance with an illustrative embodiment.
Figure 9:
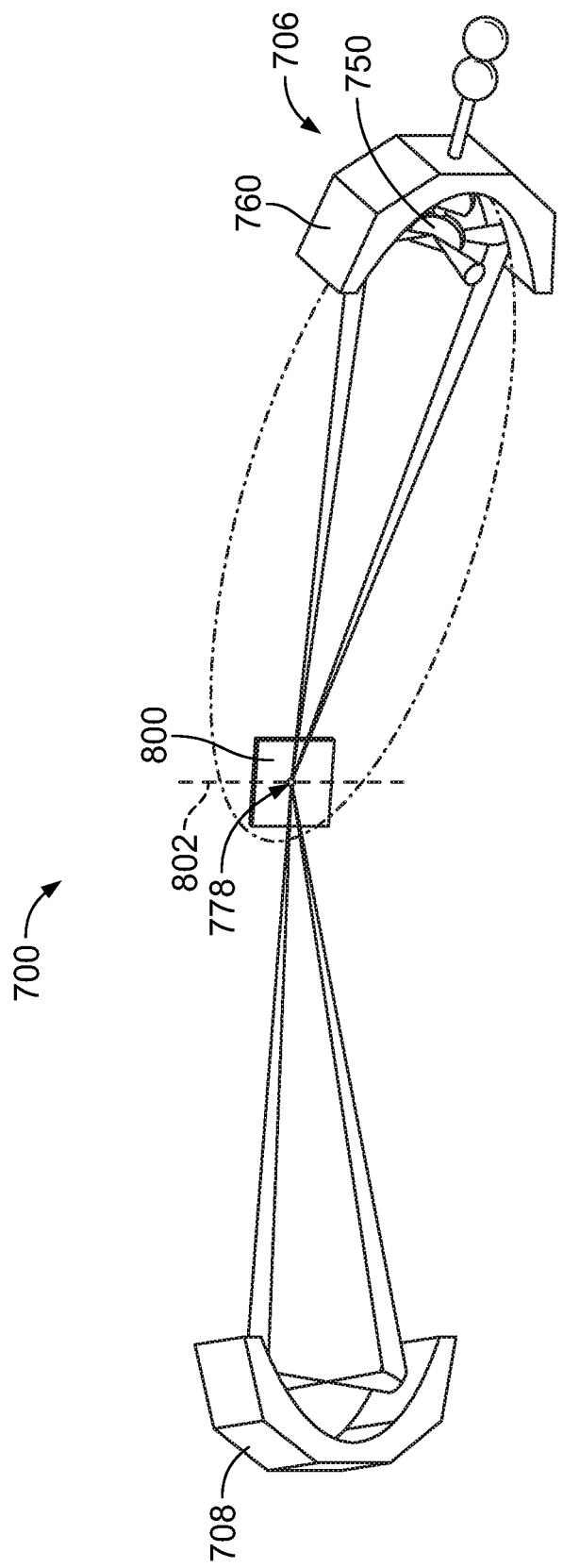
FIG. 9 illustrates a specular variable angle absolute reflectometer in a 15 degree configuration for sample reflectivity measurement, in accordance with an illustrative embodiment.
Figure 10:
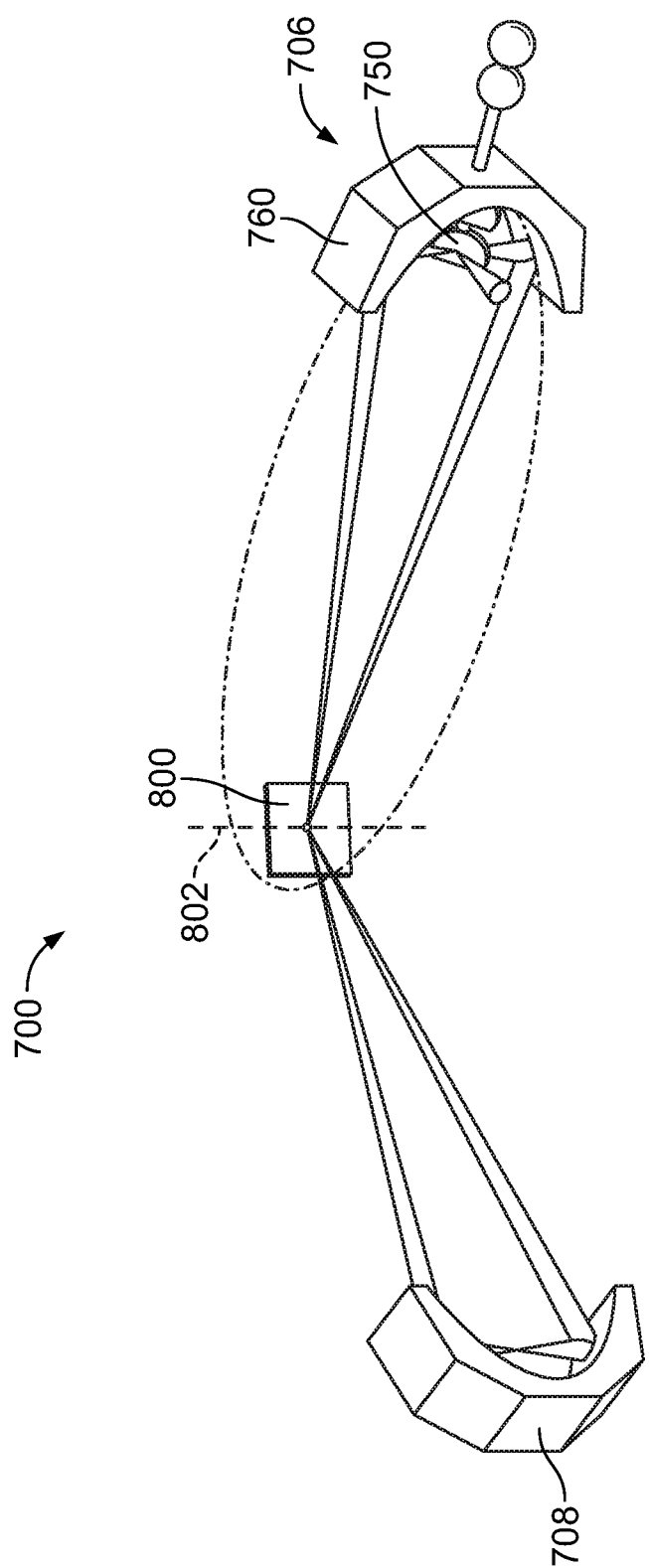
FIG. 10 illustrates a specular variable angle absolute reflectometer in a 30 degree configuration for sample reflectivity measurement, in accordance with an illustrative embodiment.

FIG. 7 is a side view of the specular variable angle absolute reflectometer 700 in accordance with an exemplary embodiment for measuring reflectance of the sample 800 (shown in FIGS. 9 and 10). FIG. 8 is a perspective view of the specular variable angle absolute reflectometer 700 in accordance with an exemplary embodiment for measuring reflectance of the sample 800 (shown in FIG. 8). The specular variable angle absolute reflectometer 700 is illustrated in a 100% reflectance measurement configuration.

The mirror system 706, in the illustrated embodiment, includes a central mirror 750 including a first face 752 and a second face 754. The central mirror 750 is used in place of the first and second mirrors 715, 717 (shown in FIGS. 5 and 6). The central mirror 750 is positioned to receive the light beam from the light source (not shown) and direct the light beam toward the sample 800 and the central mirror 750 is positioned to receive the light beam from the sample 800 and direct the light beam toward the detector (not shown). A mirror movement device 756 may be used to move the central mirror 750, such as to rotate and/or translate the central mirror 750 to control the beam reflection direction.

The specular variable angle absolute reflectometer 700 includes the elliptical roof mirror 708, which is a first elliptical roof mirror 708. The mirror system 706 includes a second elliptical roof mirror 760 disposed in the light path.

The second elliptical roof mirror 760 has a second ellipsoidal reflector surface 762 configured to reflect the light beam. The second elliptical roof mirror 760 includes an upper portion 764 and a lower portion 766. The second ellipsoidal reflector surface 762 is formed along the upper portion 764 and the lower portion 766 and shaped to reflect the light beam to/from the sample 800. The second elliptical roof mirror 760 is used for source beam focusing (to the sample 800) and reflected beam collection (from the sample 800).

The central mirror 750 is located within the concave, interior section of the elliptical roof mirror 760. The first face 752 of the central mirror 750 is configured to reflect light from the light source 702 to the second ellipsoidal reflector surface 762 and thence to the sample 800. The second ellipsoidal reflector surface 762 is configured to reflect light from the sample 800 to the central mirror 750. The second face 754 of the central mirror 750 is configured to reflect light from the sample 800 towards the detector 712.

The second ellipsoidal reflector surface 762 includes a first beam spot 770 and a second beam spot 772. The light beam is directed from the first face 752 of the central mirror 750 to the first beam spot 730. The light beam is directed from the first beam spot 730 to the sample 800. The light beam is directed from the sample 800 to the second beam spot 772. The light beam is directed from the second beam spot 772 toward the second face 754 of the central mirror 750. The first and second beam spots 770, 772 are axially aligned with a first foci 774 of an ellipse defining the ellipsoidal reflector surface 762. The central mirror 750 is located at the first foci 774. The sample 800 is axially aligned with a second foci 776 of the ellipse defining the ellipsoidal reflector surface 762. For example, the second foci 776 of the ellipse defining the ellipsoidal reflector surface 762 is aligned with the second foci 736 of the ellipse defining the ellipsoidal reflector surface 726, such as at the sample axis 802. The two ellipses defining the first and second ellipsoidal reflector surfaces 726, 762 have a common focus at the surface of the sample (measured point). The ellipsoidal reflector surface 762 converges the light beam to a beam spot 778 at the sample 800.

FIG. 9 illustrates the specular variable angle absolute reflectometer 700 in a 30 degree configuration for sample reflectivity measurement, in accordance with an illustrative embodiment. FIG. 10 illustrates the specular variable angle absolute reflectometer 700 in a 60 degree configuration for sample reflectivity measurement, in accordance with an illustrative embodiment. FIGS. 9 and 10 illustrate the sample 800 arranged at the sample axis 802. FIGS. 9 and 10 illustrate the mirror system 706 including the second elliptical roof mirror 760 and the central mirror 750.

The elliptical roof mirror 708 is configured to be rotated about sample axis 802 for measuring the reflectance of the sample 800 at various measurement angles. The elliptical roof mirror 708 is rotated to twice the desired sample incident angle of the sample 800 to intercept and return the reflected beam. FIG. 9 illustrates the elliptical roof mirror 708 rotated about sample axis 802 to a 30 degree measurement orientation and the sample 800 rotated about the sample axis 802 to a corresponding 15 degree measurement orientation. FIG. 10 illustrates the elliptical roof mirror 708 rotated about sample axis 802 to the 60 degree measurement orientation and the sample 800 rotated about the sample axis 802 to a corresponding 30 degree measurement orientation.

Figure 11:
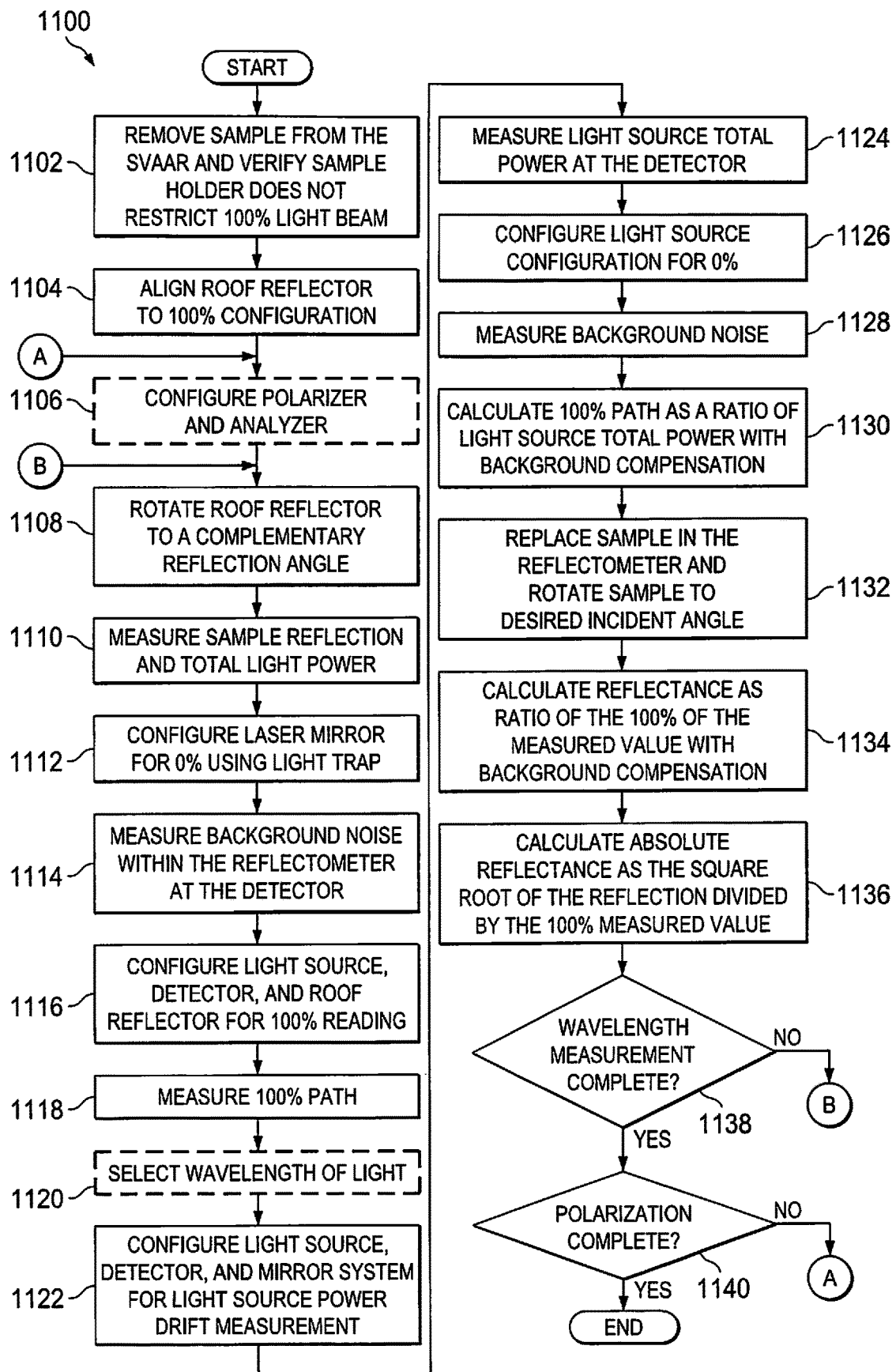
FIG. 11 illustrates a flowchart of a method for performing an absolute reflectance measurement of a sample using a specular variable angle absolute reflectometer, in accordance with an illustrative embodiment.

FIG. 11 illustrates a flowchart of a method for performing an absolute reflectance measurement of a sample using a specular variable angle absolute reflectometer, in accordance with an illustrative embodiment. The order of the steps may be changed or altered, such as to vary the order of the measurements. Method 1100 may be a method executable using any of the specular variable angle absolute reflectometers shown in FIG. 4 through FIG. 10, and also that shown in FIG. 12, below. In other words, multiple looping orders may be used for the methods described herein to optimize measurement speed.

Method 1100 may begin by removing a sample from the SVAAR (specular variable angle absolute reflectometer) and verify the sample holder does not restrict a 100% light beam (operation 1102). The term "100% light beam" refers to the light beam path taken in the reflectometer when the sample is not present.

Method 1100 also includes aligning elliptical roof reflector to the 100% configuration (operation 1104). The term "100% configuration" means that the sample is not present in the reflectometer, so that the maximum possible light from the light source will reach the detector via the other components in the reflectometer.

Optionally, method 1100 also includes configuring a polarizer and analyzer (operation 1106). This operation is considered optional because the polarizer and/or the analyzer may not be present in some implementations.

Method 1100 also includes rotating the elliptical roof reflector to a complementary reflection angle (operation 1108). The term "complementary reflection angle" refers to an angle which is complementary of to the angle at which the sample will be placed with respect to a sample axis once the sample is replaced into the reflectometer.

Method 1100 also includes measuring sample reflector and total light power (operation 1110). Again, this operation takes place while the reflectometer is in the 100% configuration, such that the maximum possible light and light power reaches the detector.

Method 1100 also includes configuring the laser mirror for 0% using the light trap (operation 1112). The light trap absorbs all of the light from the light source. The purpose of this operation is in the next operation. Specifically, method 1100 also includes measuring the background noise within the reflectometer at the detector (operation 1114).

Method 1100 also includes configuring the light source, detector, and elliptical roof reflector for a 100% reading (operation 1116). The term "100% reading" means making a measurement of light received at the detector while the reflectometer is in the 100% configuration. The light source may be any number of light sources such as a laser (either fixed wavelength or tunable wavelength), a light emitting diode (LED), an ordinary light bulb, actual sunlight, a solar lam, or any other suitable light source for the intended application.

Method 1100 also includes measuring the 100% path (operation 1118). The term "measuring the 100% path" means measuring the path length the light beam will take within the reflectometer.

Method 1100 also includes, optionally, selecting a wavelength of light (operation 1120). This operation is considered optional because it only applies if the light source is tunable, such as with a tunable laser or with a tunable light emitting diode.

Method 1100 also includes configuring the light source, detector, and mirror system for light source power drift measurement (operation 1122). The purpose of this operation is to measure how the power measured at the detector varies over time, in order to compensate for this error when taking a sample measurement.

Method 1100 also includes measuring the light source total power at the detector (operation 1124). Method 1100 then includes configuring the light source for the 0% configuration (operation 1126). Again, method 1100 includes measuring background noise (operation 1128). At this point, method 1100 includes calculating 100% path as a ratio of light source total power with background compensation (operation 1130).

Method 1100 also includes replacing the sample in the reflectometer and rotating the sample to a desired incident angle (operation 1132). Method 1100 also includes calculating the reflectance as a ratio of the 100% measured value with background compensation (operation 1134). This operation means that the total reflectance measured at this operation is compared to the background compensation and the 100% measured value so that, as closely as possible, the actual reflectance of the sample can be determined. Specifically, method 1100 also includes calculating the absolute reflectance as the square root of the reflection divided by the 100% measured value (operation 1136).

Method 1100 also includes determining whether the wavelength measurement is complete (operation 1138). If not, then method 1100 returns to operation 1108. If so, or if operation 1120 was skipped, then the process continues. In particular, method 1100 then includes determining whether the polarization is complete (operation 1140). If not, then method 1100 returns to operation 1106. If so, or if operation 1106 is skipped, then method 1100 terminates. In an exemplary embodiment, for each sample measurement (angle, polarization, wavelength) the sample reflected power, the background and laser power measurements are collected. The 100% power measurement, the background measurement and the source power measurement may be made either before or after the sample measurement. Each combination of polarization and wavelength will have a 100% throughput (e.g. watts of reading/watts of source power corrected for background) at each combination of polarization and wavelength. Each combination of polarization, wavelength and angle will have a sample throughput (e.g. watts of sample reading/watts of source power, again corrected for background).

Method 1100 is only one example of the use of a reflectometer as described with respect to FIG. 4 through FIG. 10. Other examples are possible. Thus, method 1100 does not necessarily limit the claimed inventions.

Figure 12:
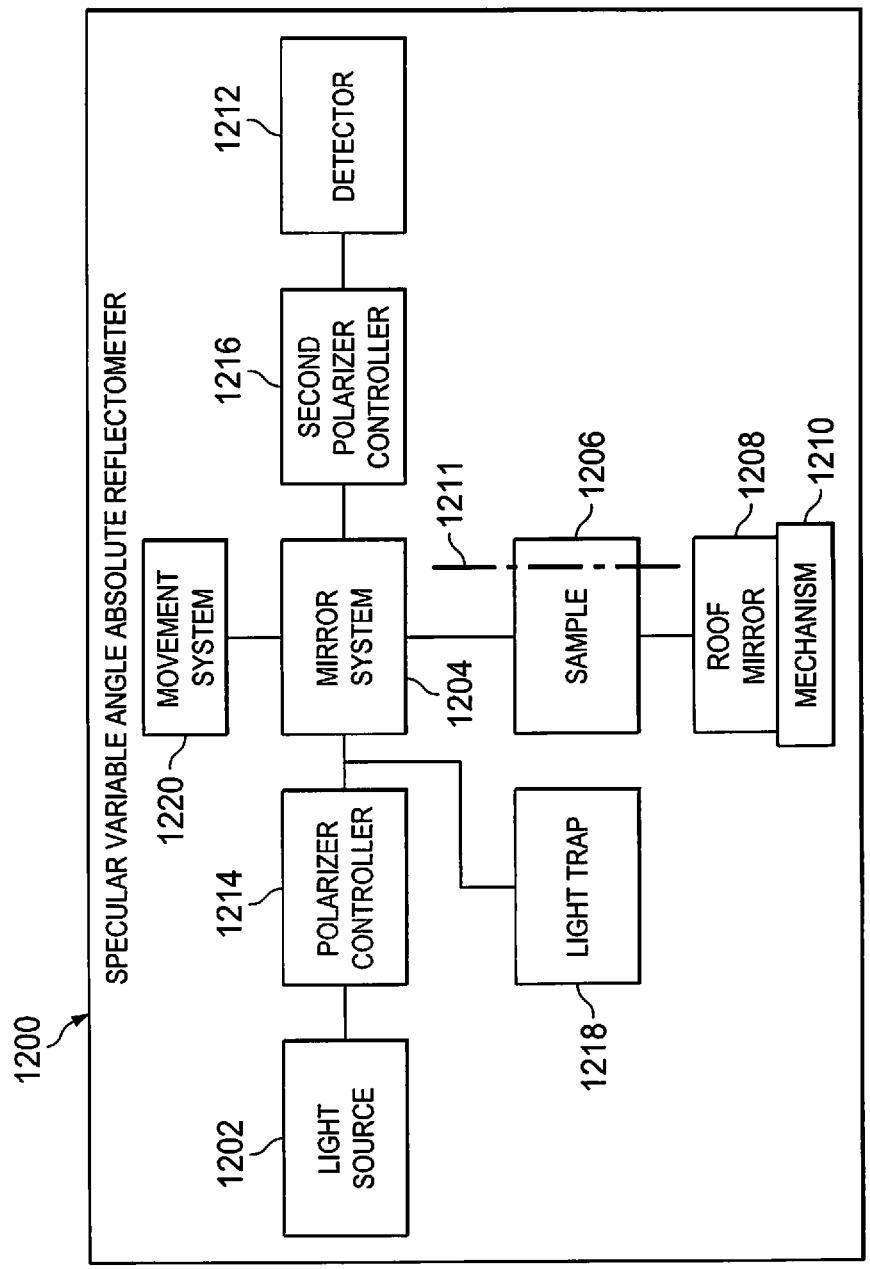
FIG. 12 illustrates a specular variable angle absolute reflectometer, in accordance with an illustrative embodiment.

FIG. 12 illustrates a specular variable angle absolute reflectometer, in accordance with an illustrative embodiment. Specular variable angle absolute reflectometer 1200 is a variation of those shown with respect to FIG. 4 through FIG. 10.

Specular variable angle absolute reflectometer 1200 includes light source 1202. Specular variable angle absolute reflectometer 1200 also includes mirror system 1204 in a light path of the light source. Mirror system 1204 may be configured to reflect a light beam from the light source 1202 towards sample 1206 that is optically reflective.

Specular variable angle absolute reflectometer 1200 also includes elliptical roof mirror 1208 disposed in the light path after sample 1206. The elliptical roof mirror 1208 includes an ellipsoidal reflector surface along an interior of the elliptical roof mirror 1208. Elliptical roof mirror 1208 is configured to reflect the light beam back towards sample 1206.

Specular variable angle absolute reflectometer 1200 also includes mechanism 1210 connected to elliptical roof mirror 1208. Mechanism 1210 may be configured to rotate elliptical roof mirror 1208 about a sample axis 1211 of sample 1206. Mechanism 1210 may be a motor, mount, micro-electromechanical device, set of gears, knobs, or any other suitable means for translating and/or rotating elliptical roof mirror 1208.

Specular variable angle absolute reflectometer 1200 also includes detector 1212 in the light path after elliptical roof mirror 1208 such that detector 1212 receives light that has been reflected from elliptical roof mirror 1208, thence back to sample 1206, thence back to the mirror system 1204, and thence to detector 1212. In an exemplary embodiment, the mirror system 1204 may include a second elliptical roof mirror having an ellipsoidal reflector surface along an interior of the second elliptical roof mirror.

In another example, the light source may be a tunable laser. However, the light source may be any suitable light source for different applications, including but not limited to fixed wavelength lasers, light emitting diodes (LEDs), solar lamps, light bulbs, natural sunlight, or other light sources appropriate for a specific application.

In another example, specular variable angle absolute reflectometer 1200 may also include polarization controller 1214 disposed in the light path between light source 1202 and mirror system 1204. In a related, but different, example, specular variable angle absolute reflectometer 1200 may additionally include second polarization controller 1216 disposed in the light path between mirror system 1204 and the detector 1212.

Second polarization controller 1216 may be generally referred to as a polarization 'analyzer' and is used to determine the rotation or change of the light polarization by sample 1206. Often, for a given input polarization, second polarization controller 1216 is rotated between about 0 to 90 degrees relative to the polarization controller 1214. If sample 1206 has had no effect on the polarization of the light, the maximum signal on detector 1212 will occur when second polarization controller 1216 is parallel with polarization controller 1214, which corresponds to '0' degrees.

In a different illustrative embodiment, mirror system 1204 may be a single mirror having a first face on a first side of the single mirror and a second face on a second side of the single mirror. In this case, the first face is configured to reflect light from light source 1202 to sample 1206, and the second face is configured to reflect light from sample 1206 towards detector 1212.

In yet another illustrative embodiment, mirror system 1204 may be a first mirror and a second mirror. In this case, the first mirror is configured to reflect light from light source 1202 to sample 1206, and the second mirror is configured to reflect light from sample 1206 towards detector 1212.

In still another illustrative embodiment, specular variable angle absolute reflectometer 1200 may include light trap 1218 associated with the mirror system. The term "associated with" in this context means that the light trap is disposed in the light path such that light trap 1218 can intercept light from light source 1202 when a position of mirror system 1204 is adjusted or when a position of light trap 1218 is adjusted. For example, light trap 1218 is configured to intercept the light from light source 1202 with a forward movement of mirror system 1204, and a direct path from light source 1202 to detector 1212 when mirror system 1204 is retracted from intercepting the light. Specular variable angle absolute reflectometer 1200 may also include movement system 1220 connected to mirror system 1204 that is configured to move mirror system 1204.

In a different example, elliptical roof mirror 1208 is rotated at a first angle about sample axis 1211 that is about twice an angular distance through with sample 1206 is rotated about sample axis 1211. In yet another example, first and second reflections from sample 1206 are coincident.

Figure 13:
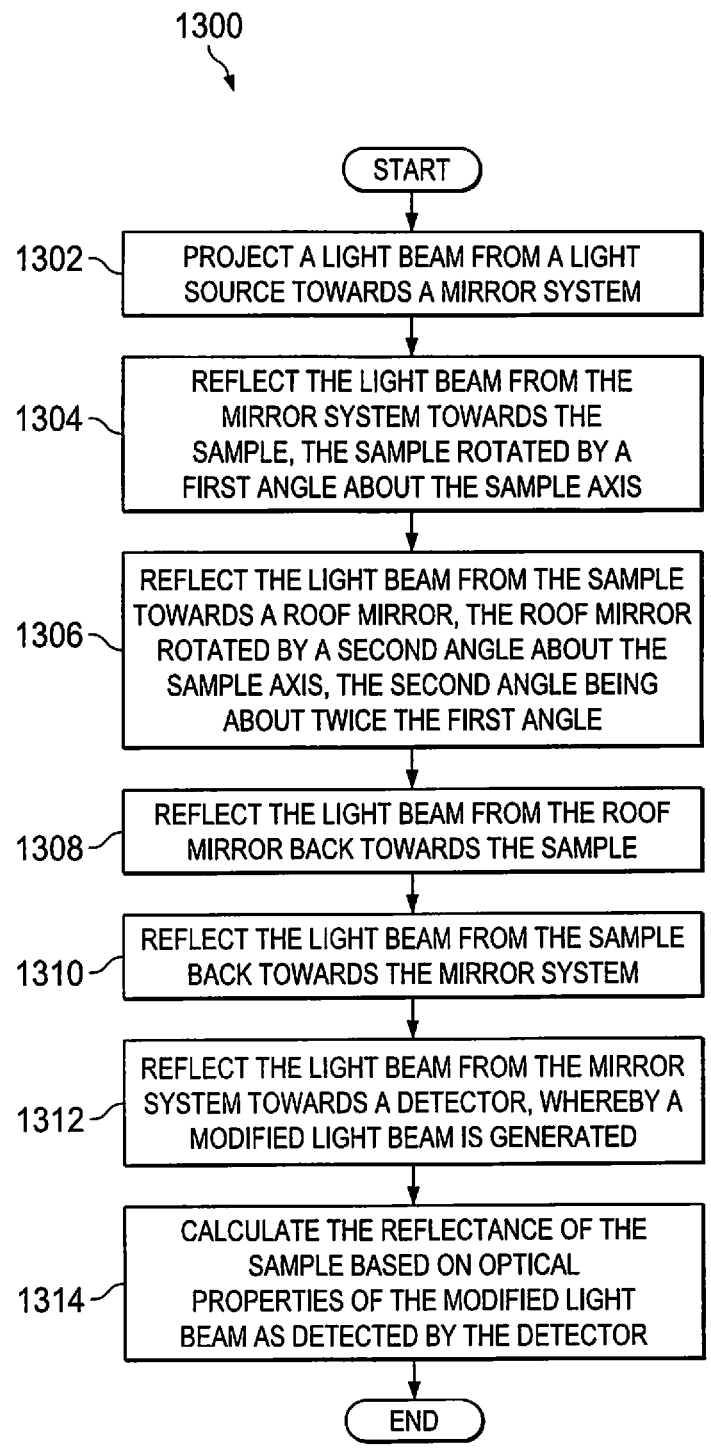
FIG. 13 illustrates a method of measuring a reflectance of a sample having a sample axis, in accordance with an illustrative embodiment.

FIG. 13 illustrates a method of measuring a reflectance of a sample having a sample axis, in accordance with an illustrative embodiment. Method 1300 is an alternative method to method 1100 of FIG. 11. Method 1300 may be implemented using any of the reflectometers shown in FIG. 4 through FIG. 10, as well as FIG. 12. Method 1300 may be characterized as a method of measuring a reflectance of a sample having a sample axis.

Method 1300 includes projecting a light beam from a light source towards a mirror system (operation 1302). Method 1300 also includes, thereafter, reflecting the light beam from the mirror system towards the sample, the sample rotated by a first angle about the sample axis (operation 1304).

Method 1300 also includes, thereafter, reflecting the light beam from the sample towards an elliptical roof mirror, the elliptical roof mirror rotated by a second angle about the sample axis, the second angle being about twice the first angle (operation 1306). The elliptical roof mirror includes an ellipsoidal reflector surface along an interior of the elliptical roof mirror. Method 1300 also includes thereafter reflecting the light beam from the elliptical roof mirror back towards the sample (operation 1308).

Method 1300 also includes, thereafter, reflecting the light beam from the sample back towards the mirror system (operation 1310). Method 1300 also includes, thereafter, reflecting the light beam from the mirror system towards a detector, whereby a modified light beam is generated (operation 1312). Method 1300 also includes calculating the reflectance of the sample based on optical properties of the modified light beam as detected by the detector (operation 1314). In one illustrative embodiment, the method may terminate thereafter.

However, method 1300 may be further varied. For example, method 1300 may also include, prior to calculating, compensating for source drift and background-introduced errors by sequentially measuring the sample, a power of the light source, and a background error. In another example, method 1300 may also include limiting a measured foot print a diameter of the light beam divided a cosine of an incident angle of the light beam on the sample.

In yet another example, method 1300 may also include focusing the light beam at the detector to maximize signal and minimize alignment criticality. In still another example, method 1300 may also include, prior to projecting, determining a 100% reflectance level of the elliptical roof mirror by measuring a reflectance of the elliptical roof mirror using the light source, mirror system, and detector but without the sample. In this case, calculating the reflectance may be calculating an absolute reflectance of the sample. Additionally, in calculating the reflectance, a ratio of the reflectance of the sample to the 100% reflectance is an absolute measure of a square of the reflectance of the sample.

Still other variations are possible. For example, in another variation, method 1300 may also include intercepting the source output with a light trap when the mirror system is retracted from intercepting the source beam. In still another variation, method 1300 may also include extracting a source signal from a background by using a chopper disposed at an output of the light source.

Still other variations are possible. For example, in another variation, method 1300 may also include reflecting the light beam using a second elliptical roof mirror of the mirror system. The second elliptical roof mirror includes a second ellipsoidal reflector surface along an interior of the second elliptical roof mirror.

Still other variations are possible. Thus, the examples provided with respect to FIG. 13 do not necessarily limit the claimed inventions.

Figure 14:
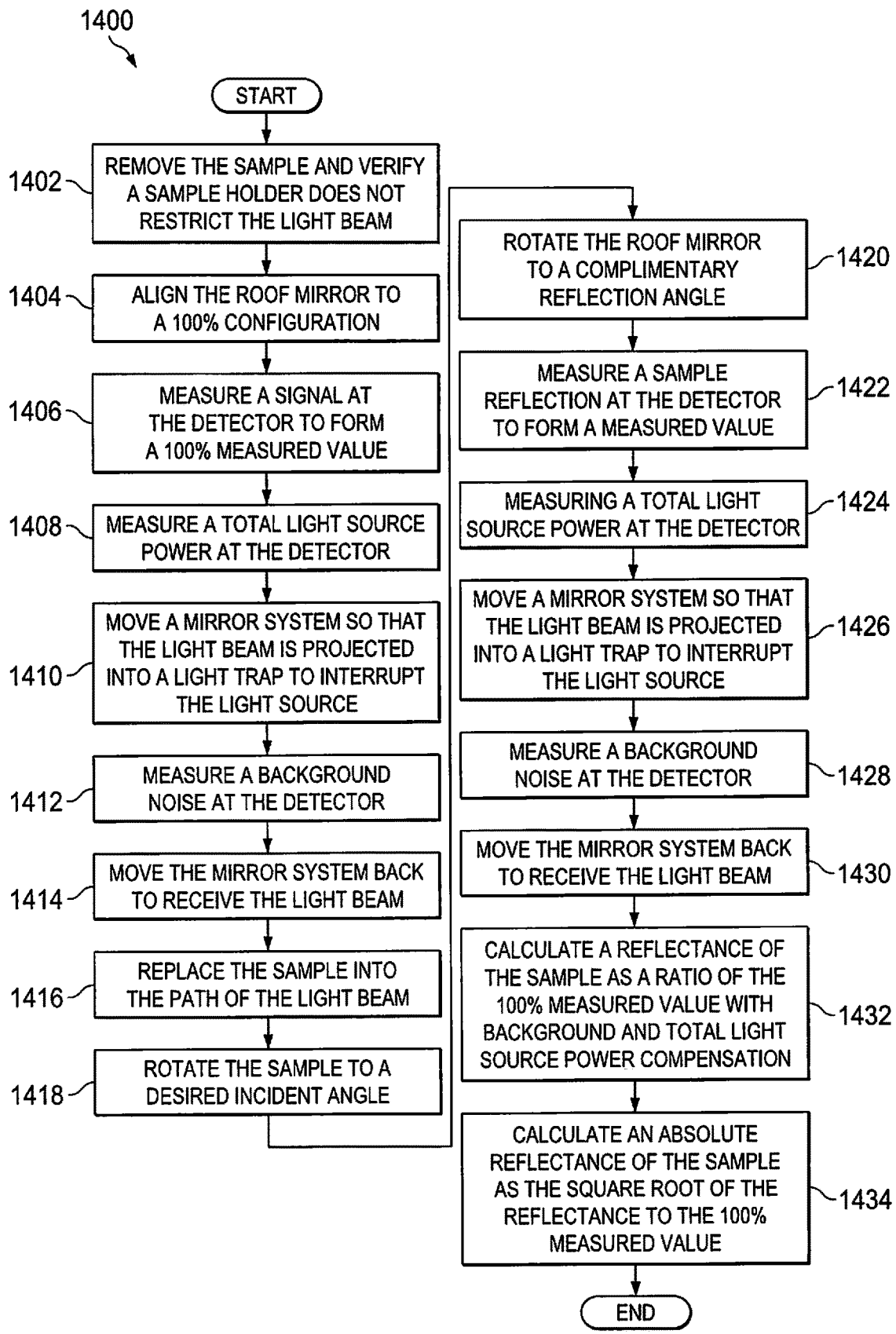
FIG. 14 illustrates a flowchart of a method of using a specular variable angle absolute reflectometer, in accordance with an illustrative embodiment.

FIG. 14 illustrates a method of using a specular variable angle absolute reflectometer, in accordance with an illustrative embodiment. Method 1400 is another variation of method 1100 of FIG. 11 or method 1300 of FIG. 13. Method 1400 may be implemented by any of the reflectometers described herein, including those shown in FIG. 4 through FIG. 10, as well as FIG. 12. Method 1400 may be characterized as a method of using a specular variable angle absolute reflectometer comprising a light source; a mirror system in a light path of the light source, the mirror system configured to reflect a light beam from the light source towards a sample that is optically reflective; an elliptical roof mirror disposed in the light path after the sample, the elliptical roof mirror configured to reflect the light beam back towards the sample, the elliptical roof mirror including an ellipsoidal reflector surface along an interior of the elliptical roof mirror; a mechanism connected to the elliptical roof mirror, the mechanism being configured to rotate the elliptical roof mirror about an axis of the sample; and a detector in the light path after the elliptical roof mirror such that the detector receives light that has been reflected from the elliptical roof mirror, thence back to the sample, thence back to the mirror system, and thence to the detector.

Method 1400 includes removing the sample and verify a sample holder does not restrict the light beam (operation 1402). Method 1400 also includes aligning the elliptical roof mirror to a 100% configuration (operation 1404).

Method 1400 also includes measuring a signal at the detector to form a 100% measured value (operation 1406). Method 1400 also includes measuring a total light source power at the detector (operation 1408). The method may include moving the mirror to collect a total source power at the detector.

Method 1400 also includes, thereafter, moving a mirror system so that the light beam is projected into a light trap to interrupt the light source (operation 1410). Method 1400 also includes, thereafter, measuring a background noise at the detector (operation 1412).

Method 1400 also includes, thereafter, moving the mirror system back to receive the light beam (operation 1402). Method 1400 also includes replacing the sample into the path of the light beam (operation 1416).

Method 1400 also includes rotating the sample to a desired incident angle (operation 1418). Method 1400 also includes rotating the elliptical roof mirror to a complimentary reflection angle (operation 1420).

Method 1400 also includes measuring a sample reflection at the detector to form a measured value (operation 1422). Method 1400 also includes measuring a total light source power at the detector (operation 1424). The method may include moving the mirror to collect a total source power at the detector.

Method 1400 also includes, thereafter, moving a mirror system so that the light beam is projected into a light trap to interrupt the light source (operation 1426). Method 1400 also includes, thereafter, measuring a background noise at the detector (operation 1428).

Method 1400 also include, thereafter, moving the mirror system back to receive the light beam (operation 1430). Method 1400 also includes calculating a reflectance of the sample as a ratio of the 100% measured value with background and total light source power compensation (operation 1432).

Method 1400 also includes calculating an absolute reflectance of the sample as the square root of the reflectance to the 100% measured value (operation 1434). In one illustrative embodiment, the method may terminate thereafter.

Figure 15:
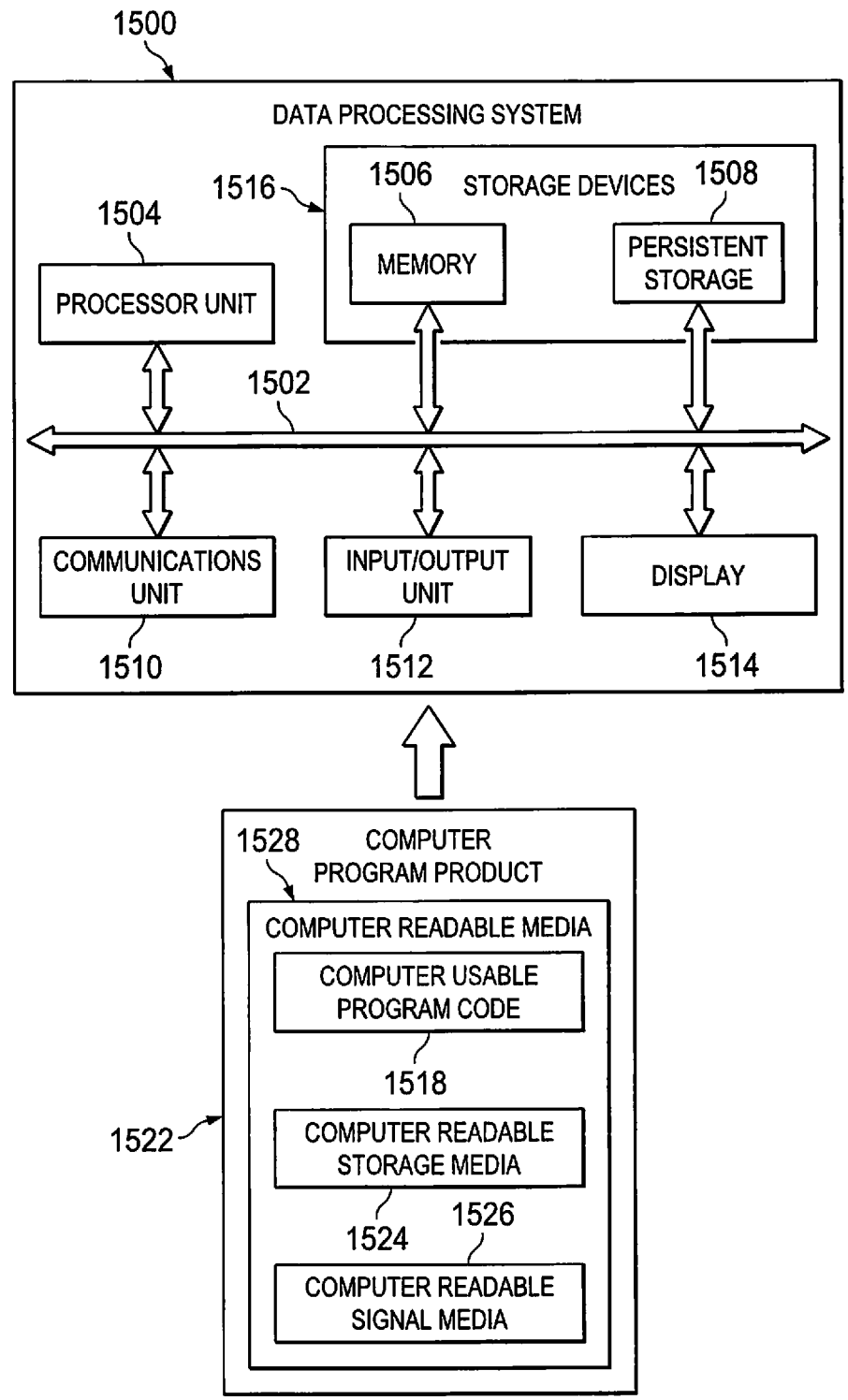
FIG. 15 illustrates a data processing system, in accordance with an illustrative embodiment.

Turning now to FIG. 15, an illustration of a data processing system is depicted in accordance with an illustrative embodiment. Data processing system 1500 in FIG. 15 is an example of a data processing system that may be used to implement data processing of detected light signals described in the above illustrative embodiments. In this illustrative example, data processing system 1500 includes communications fabric 1800, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. This software may be an associative memory, content addressable memory, or software for implementing the processes described elsewhere herein. Thus, for example, software loaded into memory 1506 may be software for executing method 1100 of FIG. 11, method 1300 of FIG. 13, or method 1400 of FIG. 14. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1800. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

As another example, a storage device in data processing system 1500 is any hardware apparatus that may store data. Memory 1506, persistent storage 1508, and computer readable media 1520 are examples of storage devices in a tangible form.

In another example, a bus system may be used to implement communications fabric 1800 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1506, or a cache, such as found in an interface and memory controller hub that may be present in communications fabric 1800.

Data processing system 1500 may also include associative memory 1528. Associative memory 1528 may be in communication with communications fabric 1800. Associative memory 1528 may also be in communication with, or in some illustrative embodiments, be considered part of storage devices 1516. While one associative memory 1528 is shown, additional associative memories may be present.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid-state memory, magnetic tape, a removable computer diskette, a random-access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A specular variable angle absolute reflectometer, comprising:
    a light source;
    a mirror system in a light path of the light source, the mirror system configured to reflect a light beam from the light source towards a sample that is optically reflective;
    an elliptical roof mirror disposed in the light path after the sample, the elliptical roof mirror having an ellipsoidal reflector surface configured to reflect the light beam back towards the sample;
    a mechanism connected to the elliptical roof mirror, the mechanism being configured to rotate the elliptical roof mirror about an axis of the sample; and
    a detector in the light path configured to receive light from the light path and calculate a reflectance of the sample.

2. The specular variable angle absolute reflectometer of claim 1, wherein the elliptical roof mirror includes an upper portion and a lower portion, the ellipsoidal reflector surface being concave between the upper portion and the lower portion facing the sample.

3. The specular variable angle absolute reflectometer of claim 1, wherein the ellipsoidal reflector surface includes a first beam spot and a second beam spot, the light beam being directed from the sample to the first beam spot, the light beam being directed from the first beam spot to the second beam spot, the light beam being directed from the second beam spot back toward the sample, the first and second beam spots being axially aligned with a first foci of an ellipse defining the ellipsoidal reflector surface, the sample being axially aligned with a second foci of the ellipse defining the ellipsoidal reflector surface.

4. The specular variable angle absolute reflectometer of claim 1, wherein the mirror system includes a second elliptical roof mirror disposed in the light path, the second elliptical roof mirror having a second ellipsoidal reflector surface configured to reflect the light beam, the mirror system including a central mirror having a first face on a first side of the central mirror and a second face on a second side of the central mirror, wherein the first face is configured to reflect light from the light source to the second ellipsoidal reflector surface and thence to the sample, wherein the second ellipsoidal reflector surface is configured to reflect light from the sample to the central mirror, and wherein the second face is configured to reflect light from the sample towards the detector.

5. The specular variable angle absolute reflectometer of claim 4, wherein the second ellipsoidal reflector surface includes a first beam spot and a second beam spot, the light beam being directed from the first side of the central mirror to the first beam spot, the light beam being directed from the first beam spot to the sample, the light beam being directed from the sample to the second beam spot, the light beam being directed from the second beam spot toward the second surface of the central mirror, the first and second beam spots being axially aligned with a first foci of an ellipse defining the ellipsoidal reflector surface, the sample being axially aligned with a second foci of the ellipse defining the ellipsoidal reflector surface.

6. The specular variable angle absolute reflectometer of claim 1, wherein the ellipsoidal reflector surface converges the light beam to a beam spot at the sample.

7. The specular variable angle absolute reflectometer of claim 1, wherein the light source comprises a tunable laser.

8. The specular variable angle absolute reflectometer of claim 1 further comprising a polarization controller disposed in the light path between the light source and the mirror system.

9. The specular variable angle absolute reflectometer of claim 8 further comprising a second polarization controller disposed in the light path between the mirror system and the detector.

10. The specular variable angle absolute reflectometer of claim 1, wherein the mirror system comprises a single mirror having a first face on a first side of the single mirror and a second face on a second side of the single mirror, wherein the first face is configured to reflect light from the light source to the sample, and wherein the second face is configured to reflect light from the sample towards the detector.

11. The specular variable angle absolute reflectometer of claim 1, wherein the mirror system comprises a first mirror and a second mirror, wherein the first mirror is configured to reflect light from the light source to the sample, and wherein the second mirror is configured to reflect light from the sample towards the detector.

12. The specular variable angle absolute reflectometer of claim 1 further comprising:
   a light trap associated with the mirror system, the light trap configured to intercept the light from the light source with a forward movement of the mirror system, and a direct path from the light source to the detector when the mirror system is retracted from intercepting the light;
   and a movement system connected to the mirror system and configured to move the mirror system.

13. The specular variable angle absolute reflectometer of claim 1, wherein the elliptical roof mirror is rotated at a first angle about the sample axis that is about twice an angular distance through which the sample is rotated about the sample axis.

14. The specular variable angle absolute reflectometer of claim 1, wherein first and second reflections from the sample are coincident.

15. A method of measuring a reflectance of a sample having a sample axis, the method comprising:
   projecting a light beam from a light source towards a mirror system;
   thereafter reflecting the light beam from the mirror system towards the sample, the sample rotated by a first angle about the sample axis;
   thereafter reflecting the light beam from the sample towards an elliptical roof mirror, the elliptical roof mirror having an ellipsoidal reflector surface, the elliptical roof mirror rotated by a second angle about the sample axis, the second angle being about twice the first angle;
   thereafter reflecting the light beam from the ellipsoidal reflector surface of the elliptical roof mirror back towards the sample;
   thereafter reflecting the light beam from the sample back towards the mirror system;
   thereafter reflecting the light beam from the mirror system towards a detector, whereby a modified light beam is generated; and
   calculating the reflectance of the sample based on optical properties of the modified light beam as detected by the detector.

16. The method of claim 15 further comprising prior to calculating, compensating for source drift and background-introduced errors by sequentially measuring the sample, a power of the light source, and a background error.

17. The method of claim 15 further comprising limiting a measured foot print a diameter of the light beam divided a cosine of an incident angle of the light beam on the sample.

18. The method of claim 15 further comprising focusing the light beam at the detector to maximize signal and minimize alignment criticality.

19. The method of claim 15 further comprising prior to projecting, determining a 100% reflectance level of the elliptical roof mirror by measuring a reflectance of the elliptical roof mirror using the light source, mirror system, and detector but without the sample.

20. The method of claim 19, wherein calculating the reflectance comprises calculating an absolute reflectance of the sample.

21. The method of claim 20, wherein in calculating the reflectance, a ratio of the reflectance of the sample to the 100% reflectance is an absolute measure of a square of the reflectance of the sample.

22. The method of claim 15 further comprising intercepting an output from the light source with a light trap when the mirror system is retracted from intercepting the source beam.

23. A method of using a specular variable angle absolute reflectometer comprising a light source; a mirror system in a light path of the light source, the mirror system configured to reflect a light beam from the light source towards a sample that is optically reflective; an elliptical roof mirror disposed in the light path after the sample, the elliptical roof mirror having an ellipsoidal reflector surface configured to reflect the light beam back towards the sample; a mechanism connected to the elliptical roof mirror, the mechanism being configured to rotate the elliptical roof mirror about an axis of the sample; and a detector in the light path after the elliptical roof mirror such that the detector receives light that has been reflected from the elliptical roof mirror, thence back to the sample, thence back to the mirror system, and thence to the detector, the method comprising:
   removing the sample and verify a sample holder does not restrict the light beam;
   aligning the elliptical roof mirror to a 100% configuration;
   measuring a signal at the detector to form a 100% measured value;
   measuring a total light source power at the detector;
   thereafter moving a mirror system so that the light beam is projected into a light trap to interrupt the light source;
   thereafter measuring a background noise at the detector;
   thereafter moving the mirror system back to receive the light beam;
   replacing the sample into the path of the light beam;
   rotating the sample to a desired incident angle;
   rotating the elliptical roof mirror to a complimentary reflection angle;
   measuring a sample reflection at the detector to form a measured value;
   measuring a total light source power at the detector;
   thereafter moving a mirror system so that the light beam is projected into a light trap to interrupt the light source;
   thereafter measuring a background noise at the detector;
   thereafter moving the mirror system back to receive the light beam;
   calculating a reflectance of the sample as a ratio of the 100% measured value with background compensation; and
   calculating an absolute reflectance of the sample as a square root of the reflectance to the 100% measured value.

* * * * *